US012303849B2

(12) United States Patent
Snider et al.

(10) Patent No.: US 12,303,849 B2
(45) Date of Patent: May 20, 2025

(54) MIXING LIQUIDS USING AN AUTOMATED LIQUID HANDLING SYSTEM

(71) Applicant: Revvity Health Sciences, Inc., Waltham, MA (US)

(72) Inventors: Adam Snider, Providence, RI (US); Andrew Brodsky, Brookline, MA (US)

(73) Assignee: REVVITY HEALTH SCIENCES, INC., Waltham, MA (US)

( * ) Notice: Subject to any disclaimer, the term of this patent is extended or adjusted under 35 U.S.C. 154(b) by 301 days.

(21) Appl. No.: 17/343,256

(22) Filed: Jun. 9, 2021

(65) Prior Publication Data

US 2022/0395784 A1 Dec. 15, 2022

(51) Int. Cl.

| | |
|---|---|
| ***B01F 33/3039*** | (2022.01) |
| ***B01F 33/30*** | (2022.01) |
| ***B01F 35/21*** | (2022.01) |
| ***B01F 35/221*** | (2022.01) |
| ***B01F 35/71*** | (2022.01) |
| ***B01F 35/75*** | (2022.01) |
| *B01F 101/23* | (2022.01) |

(52) U.S. Cl.

CPC ........ *B01F 33/3039* (2022.01); *B01F 33/304* (2022.01); *B01F 35/2116* (2022.01); *B01F 35/2213* (2022.01); *B01F 35/22161* (2022.01); *B01F 35/7176* (2022.01); *B01F 35/7544* (2022.01); *B01F 2101/23* (2022.01)

(58) Field of Classification Search

CPC .... B01F 33/3039; B01F 2101/23; B01L 3/02; B01L 3/0227; B01L 3/0234

See application file for complete search history.

(56) References Cited

U.S. PATENT DOCUMENTS

RE28,072 E * 7/1974 Sluijters .............. B01F 25/4321 366/337
5,773,305 A 6/1998 Zabetakis et al.

(Continued)

FOREIGN PATENT DOCUMENTS

| | | |
|---|---|---|
| JP | 2007074960 A | 3/2007 |
| WO | 2008126827 A1 | 10/2008 |
| WO | 2020050235 A1 | 3/2020 |

OTHER PUBLICATIONS

R. H. Liu et al., "Passive mixing in a three-dimensional serpentine microchannel," in Journal of Microelectromechanical Systems, vol. 9, No. 2, pp. 190-197, Jun. 2000, doi: 10.1109/84.846699. (Year: 2000).*

(Continued)

*Primary Examiner* — Marc C Howell
*Assistant Examiner* — Patrick M McCarty
(74) *Attorney, Agent, or Firm* — Myers Bigel, P.A.

(57) ABSTRACT

A method for mixing liquids using an automated liquid handling system includes: aspirating liquid volumes of a first liquid and a second liquid from alternating ones of a first liquid supply and a second liquid supply into a mixing volume such that the aspirated liquid volumes form a liquid stack including a series of alternating, interfacing layers of the first and second liquids in the mixing volume; permitting the interfacing layers of the first and second liquids to mix with one another by diffusion in the mixing volume to form a mixture liquid; and dispensing the mixture liquid from the mixing volume.

25 Claims, 20 Drawing Sheets

(56) References Cited

U.S. PATENT DOCUMENTS 6,261,847 B1 * 7/2001 Eherts .................. B01F 31/651 422/514
7,198,956 B2 4/2007 Uffenheimer et al.
7,270,284 B2 9/2007 Liao et al.
8,524,506 B2 9/2013 Pamula et al.
8,591,832 B2 * 11/2013 Nelson .............. G01N 35/0099 422/522
10,830,784 B2 * 11/2020 Whitacre .......... G01N 35/1002
11,016,008 B2 * 5/2021 Drews .................... B01L 3/502
2004/0011413 A1 1/2004 Fujii et al.
2005/0214172 A1 * 9/2005 Burgisser ............... B01L 3/022 422/400
2007/0039866 A1 * 2/2007 Schroeder ........ B01L 3/502715 210/265
2009/0092526 A1 * 4/2009 Miller ................. B01J 19/0093 366/337
2012/0045370 A1 * 2/2012 Asano ................ B01F 25/4321 422/105
2012/0258026 A1 * 10/2012 Naumann ............ B01L 3/0234 422/521
2012/0264233 A1 * 10/2012 Jansson ................. G01N 21/05 436/501
2015/0045234 A1 * 2/2015 Stone ............... B01L 3/502715 435/6.1
2016/0033543 A1 * 2/2016 Stankus ................. B01L 3/502 435/6.12
2021/0373044 A1 * 12/2021 Miyazato ............... B01L 3/022
2022/0017890 A1 * 1/2022 Lee ....................... C12M 47/06

OTHER PUBLICATIONS

Williams, J. W., & Cady, L. C. (1934). Molecular Diffusion in Solution. Chemical Reviews, 14(2), 171-217. (Year: 1934).*
"Microfluidic Mixing" Massachusetts Institute of Technology, MIT OpenCourseWare (13 pages) (2016).
Notification of Transmittal of the International Search Report and the Written Opinion of the International Searching Authority, or the Declaration, in corresponding PCT Application No. PCT/US2022/031695 (Oct. 7, 2022).

* cited by examiner

MIXING LIQUIDS USING AN AUTOMATED LIQUID HANDLING SYSTEM

FIELD

The present technology relates to automated liquid handling systems and, more particularly, to the apparatus and methods for mixing liquids using an automated liquid handling system.

BACKGROUND

Laboratory liquid handling systems are used to transport and operate on volumes of liquid. One or more liquid samples may be provided in a labware container (e.g., microwell plate or sample tube holder) in a liquid handling system. The liquid handling system may include one or more pipettors that are used to remove (e.g., by aspirating) portions of the samples from the labware and/or to add (e.g., by dispensing) material to the samples in the labware. In some cases, it may be desirable or necessary to mix liquids within the system. It may be desirable or necessary to mix the liquids robotically and, in some cases, automatically and programmatically. Liquid handler systems, such as robotic laboratory liquid handling systems, typically use induced turbulent flow or shear flow to mix two liquids having different compositions. These mixing methods rely on high flow velocity and may require precise control of fluid streams. Higher flow rates require more powerful and typically more expensive and bulkier physical infrastructure. More precise control typically requires tighter tolerances, and therefore more difficult and expensive manufacturing.

SUMMARY

Provided herein are methods and apparatus for mixing liquids in an automated liquid handling system. In one aspect, a method for mixing liquids using an automated liquid handling system includes: aspirating liquid volumes of a first liquid and a second liquid from alternating ones of a first liquid supply and a second liquid supply into a mixing volume such that the aspirated liquid volumes form a liquid stack including a series of alternating, interfacing layers of the first and second liquids in the mixing volume; permitting the interfacing layers of the first and second liquids to mix with one another by diffusion in the mixing volume to form a mixture liquid; and dispensing the mixture liquid from the mixing volume.

The second liquid may be different from the first liquid.

The liquid stack may include at least two layers of the first liquid disposed in alternating series with at least two layers of the second liquid.

The liquid stack may include at least two layers of the first liquid disposed in alternating series with at least two layers of the second liquid.

Each of the layers of the first and second liquids may have a volume in the range of from about 3 microliters to 25 microliters.

In some embodiments, a total volume of the layers of the first liquid in the liquid stack is greater than a total volume of the layers of the second liquid in the liquid stack.

In some embodiments, a total volume of the layers of the first liquid in the liquid stack is substantially equal to a total volume of the layers of the second liquid in the liquid stack.

In some embodiments, permitting the interfacing layers of the first and second liquids to mix with one another by diffusion in the mixing volume to form the mixture liquid includes permitting the interfacing layers of the first and second liquids to mix with one another by diffusion in the mixing volume for at least 4 seconds.

The first liquid may have a different composition than the second liquid.

In some embodiments, the first liquid is a reaction mixture including DNA fragments and the second liquid includes a ligase enzyme.

In some embodiments, the first liquid has a different viscosity than the second liquid.

According to some embodiments, the first liquid has a different chemical composition than the second liquid.

According to some embodiments, the mixing volume is elongate and has a lengthwise axis, and the layers of the first and second liquids in the liquid stack are stacked along the lengthwise axis.

In some embodiments, each of the layers of the first and second liquids has a layer diameter to layer height ratio of at least 0.016.

According to some embodiments, each of the layers of the first and second liquids has a layer liquid volume and an interface surface area with an adjacent one of the layers of the first and second liquids, and a ratio of the interface surface area to the layer liquid volume is at least 0.02 l/mm.

According to some embodiments, the act of aspirating liquid volumes of the first and second liquids from alternating ones of the first and second liquid supplies into the mixing volume includes aspirating the liquid volumes of the first and second liquids into a tubular probe through a probe inlet.

The act of dispensing the mixture liquid from the mixing volume may include dispensing the mixture liquid from the tubular probe through the probe inlet.

According to some embodiments, the tubular probe includes a probe passage, and at least a portion of the liquid stack is disposed in the probe passage during the act of permitting the interfacing layers of the first and second liquids to mix with one another by diffusion in the mixing volume to form the mixture liquid.

A flexible conduit defining a conduit passage may be fluidly coupled to the tubular probe, a pump is fluidly coupled to the probe inlet via the conduit passage, and at least a portion of the liquid stack is disposed in the conduit passage during the act of permitting the interfacing layers of the first and second liquids to mix with one another by diffusion in the mixing volume to form the mixture liquid.

The act of aspirating liquid volumes of the first and second liquids from alternating ones of the first and second liquid supplies into the mixing volume may include automatically and programmatically operating a pump coupled to the tubular probe to aspirate the first and second liquids from the first and second liquid supplies.

The act of dispensing the mixture liquid from the mixing volume may include automatically and programmatically operating the pump to dispense the mixture liquid from the mixing volume out the probe inlet of the tubular probe.

The pump may be a syringe pump, bellows, peristaltic pump, or screw-type pump and may work by generating pressure or displacing volume of air or liquid.

According to some embodiments, the first liquid supply includes a first reservoir containing the first liquid, the second liquid supply includes a second reservoir containing the second liquid, and the act of aspirating liquid volumes of the first and second liquids from alternating ones of the first and second liquid supplies into the mixing volume includes: automatically and programmatically positioning the probe inlet in the first reservoir; thereafter automatically and programmatically aspirating a first liquid volume of the first liquid into the tubular probe through the probe inlet; thereafter automatically and programmatically positioning the tubular probe inlet in the second reservoir; thereafter automatically and programmatically aspirating a second liquid volume of the second liquid into the tubular probe through the probe inlet; thereafter automatically and programmatically positioning the tubular probe inlet in the first reservoir; thereafter automatically and programmatically aspirating a third liquid volume of the first liquid into the tubular probe through the probe inlet; thereafter automatically and programmatically positioning the probe inlet in the second reservoir; and thereafter automatically and programmatically aspirating a fourth liquid volume of the second liquid into the tubular probe through the probe inlet.

The aspirating act may include aspirating liquid volumes of the first and second liquids from alternating ones of the first and second liquid supplies into each of a plurality of mixing volumes through a plurality of probe inlets such that the aspirated liquid volumes form a respective liquid stack in each of the mixing volumes, each liquid stack including a series of alternating, interfacing layers of the first and second liquids in the respective mixing volume; the act of permitting may include permitting the interfacing layers of the first and second liquids to mix with one another by diffusion in each of the mixing volumes to form a mixture liquid; and the act of dispensing may include dispensing the respective mixture liquids from each of the mixing volumes.

The aspirating liquid volumes of the first and second liquids from alternating ones of the first and second liquid supplies may include automatically and programmatically operating a single pump actuator to aspirate the liquid volumes of the first and second liquids through each of the probe inlets.

In some embodiments, the act of dispensing the respective mixture liquids from the mixing volume includes dispensing a first volume of the mixture liquid into a first reservoir and a second volume of the mixture liquid into a second reservoir, and the method further includes: aspirating liquid volumes of the mixture liquid from alternating ones of the first and second reservoirs into the mixing volume such that the aspirated liquid volumes of the mixture liquid form a second liquid stack including a series of alternating, interfacing layers of the mixture liquid in the mixing volume; permitting the interfacing layers of the mixture liquid to mix with one another by diffusion in the mixing volume to form a second mixture liquid; and dispensing the second mixture liquid from the mixing volume.

In a further aspect, an automated liquid handling system for use with a first liquid supply including a first liquid and a second liquid supply including a second liquid includes a pressure control mechanism, a mixing volume, and a controller. The controller is configured to: operate the pressure control mechanism to aspirate liquid volumes of the first and second liquids from alternating ones of the first and second liquid supplies into a mixing volume such that the aspirated liquid volumes form a liquid stack including a series of alternating, interfacing layers of the first and second liquids in the mixing volume; permit the interfacing layers of the first and second liquids to mix with one another by diffusion in the mixing volume to form a mixture liquid; and operate the pressure control mechanism to dispense the mixture liquid from the mixing volume.

The pressure control mechanism may include a pump and a pump actuator.

The controller may be configured to automatically and programmatically operate the pump actuator to aspirate liquid volumes of the first and second liquids, permit the interfacing layers of the first and second liquids to mix with one another by diffusion, and operate the pump actuator to dispense the mixture liquid.

According to some embodiments, the automated liquid handling system includes a tubular probe having a probe inlet. The automated liquid handling system is configured to aspirate the liquid volumes of the first and second liquids from alternating ones of the first and second liquid supplies into the mixing volume through the probe inlet This Summary is not exhaustive of the scope of the present aspects and embodiments. Thus, while certain aspects and embodiments have been presented and/or outlined, it should be understood that the present aspects and embodiments are not limited to the aspects and embodiments in this Summary. Indeed, other aspects and embodiments, which may be similar to and/or different from, the aspects and embodiments presented in this Summary, will be apparent from the description, illustrations and/or claims, which follow.

It should also be understood that any aspects and embodiments that are described in this Summary and do not appear in the claims that follow are preserved for later presentation in this application or in one or more continuation patent applications.

It should also be understood that any aspects and embodiments that are not described in this Summary and do not appear in the claims that follow are also preserved for later presentation or in one or more continuation patent applications.

BRIEF DESCRIPTION OF THE DRAWINGS

The accompanying drawings, which form a part of the specification, illustrate embodiments of the technology.

DETAILED DESCRIPTION

Liquid handler systems, such as robotic laboratory liquid handling systems, typically use induced turbulent flow or shear flow to mix two liquids having different compositions. These mixing methods rely on high flow velocity and may require precise control of fluid streams. The inventors have found that such techniques are unsuitable for some liquid handling technologies. For example, some automated liquid handlers, such as high throughput, low cost liquid handlers, are not configured to generate the turbulence necessary to effectively mix some liquids, such as those having different viscosities.

Apparatus and methods according to embodiments of the technology can address shortcomings of the known liquid mixing methods. In particular, apparatus and methods according to embodiments of the technology can effectively and quickly mix volumes of different component liquids using diffusion mixing without high speed or turbulent flow. The apparatus and methods may be particularly advantageous for mixing relatively small volumes of liquids (e.g., microfluidic volumes in the range of from about 10 microliters to 200 microliters). This range of liquid volumes may be referred to as a mesofluidic volume range.

Figure 1:
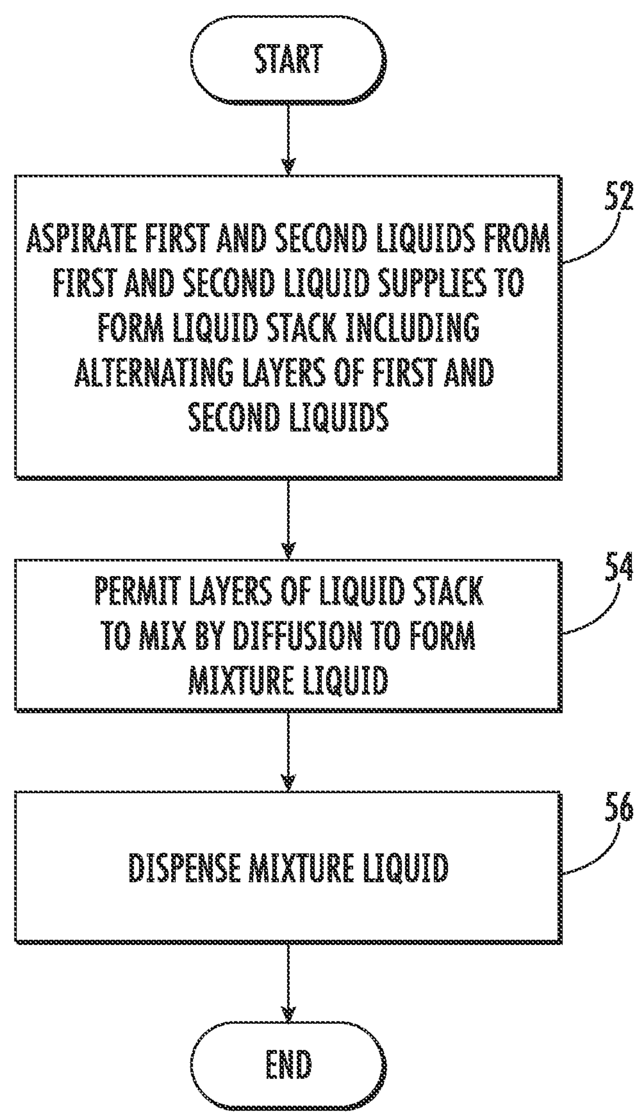
FIG. 1 is a flow chart representing methods according to embodiments of the technology for mixing liquids using an automated liquid handling system.

FIG. 1 is a flowchart representing methods according to some embodiments of the technology for mixing a first liquid (from a first liquid supply) and a second liquid (from a second liquid supply). Liquid volumes of the first and second liquids are aspirated from alternating ones of the first and second liquid supplies into a mixing volume such that the aspirated liquid volumes form a liquid stack including a series of alternating, interfacing layers of the first and second liquids in the mixing volume (Block 52). The interfacing layers of the first and second liquids are then permitted to mix with one another by diffusion in the mixing volume to form a mixture liquid (Block 54). The mixture liquid is then dispensed from the mixing volume (Block 56). In some embodiments, the second liquid is different from the first liquid.

Figure 2:
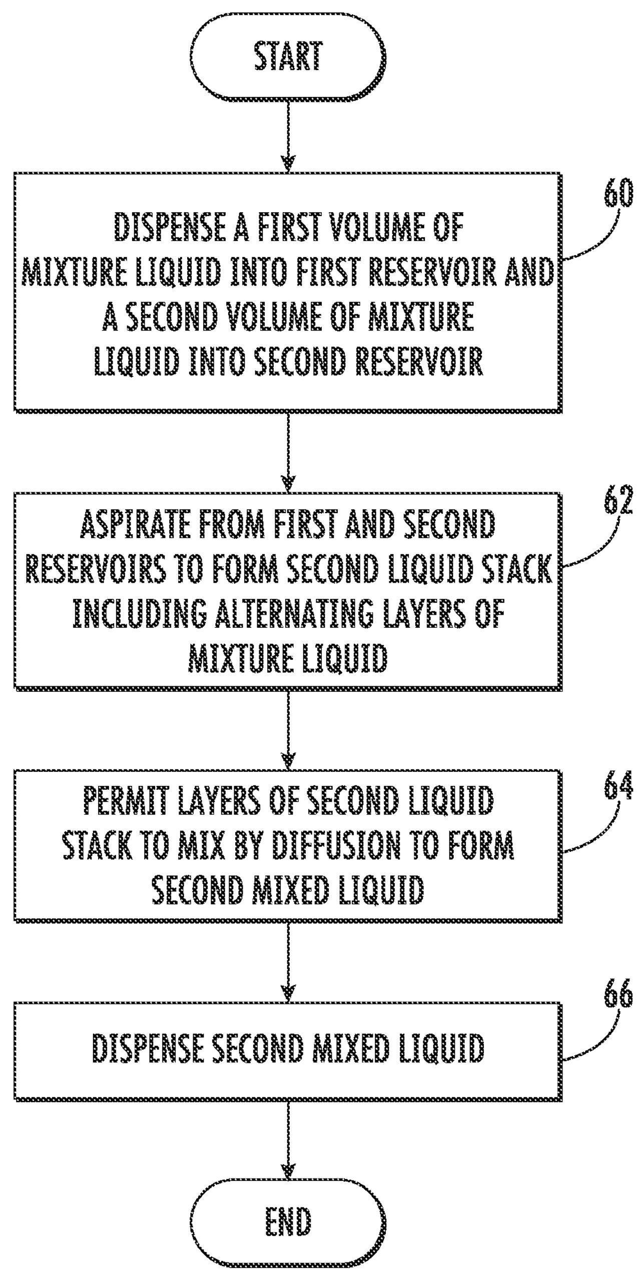
FIG. 2 is a flow chart representing further methods according to embodiments of the technology for mixing liquids using an automated liquid handling system.

With reference to FIG. 2, the method may further include further mixing the mixture liquid that is the product of the method of FIG. 1. The dispensing of the mixture liquid from the mixing volume (Block 56; FIG. 1) may include dispensing a first volume of the mixture liquid into a first reservoir and a second volume of the mixture liquid into a second reservoir (Block 60; FIG. 2). Liquid volumes of the mixture liquid are then aspirated from alternating ones of the first and second reservoirs into the mixing volume such that the aspirated liquid volumes of the mixture liquid form a second liquid stack including a series of alternating, interfacing layers of the mixture liquid in the mixing volume (Block 62). The interfacing layers of the mixture liquid are then permitted to mix with one another by diffusion in the mixing volume to form a second mixture liquid (Block 64). The second mixture liquid is then dispensed from the mixing volume (Block 66).

The multiple, repeated layering of the first and second liquids increases the total interfacial area between the first and second liquids, thereby increasing the rate of diffusion between the first and second liquids. The enhanced rate of diffusion can provide a sufficiently high mixing rate without the need for turbulent flow.

In some embodiments, the automated liquid handler sips or aspirates the alternating layers of the first and second liquids into the mixing volume from the respective liquid supplies through a tubular probe (e.g., pipette), and dispenses the mixture liquid from the tubular probe. The tubular probe can be conveniently and effectively integrated and operated within a liquid handling system.

Figure 3:
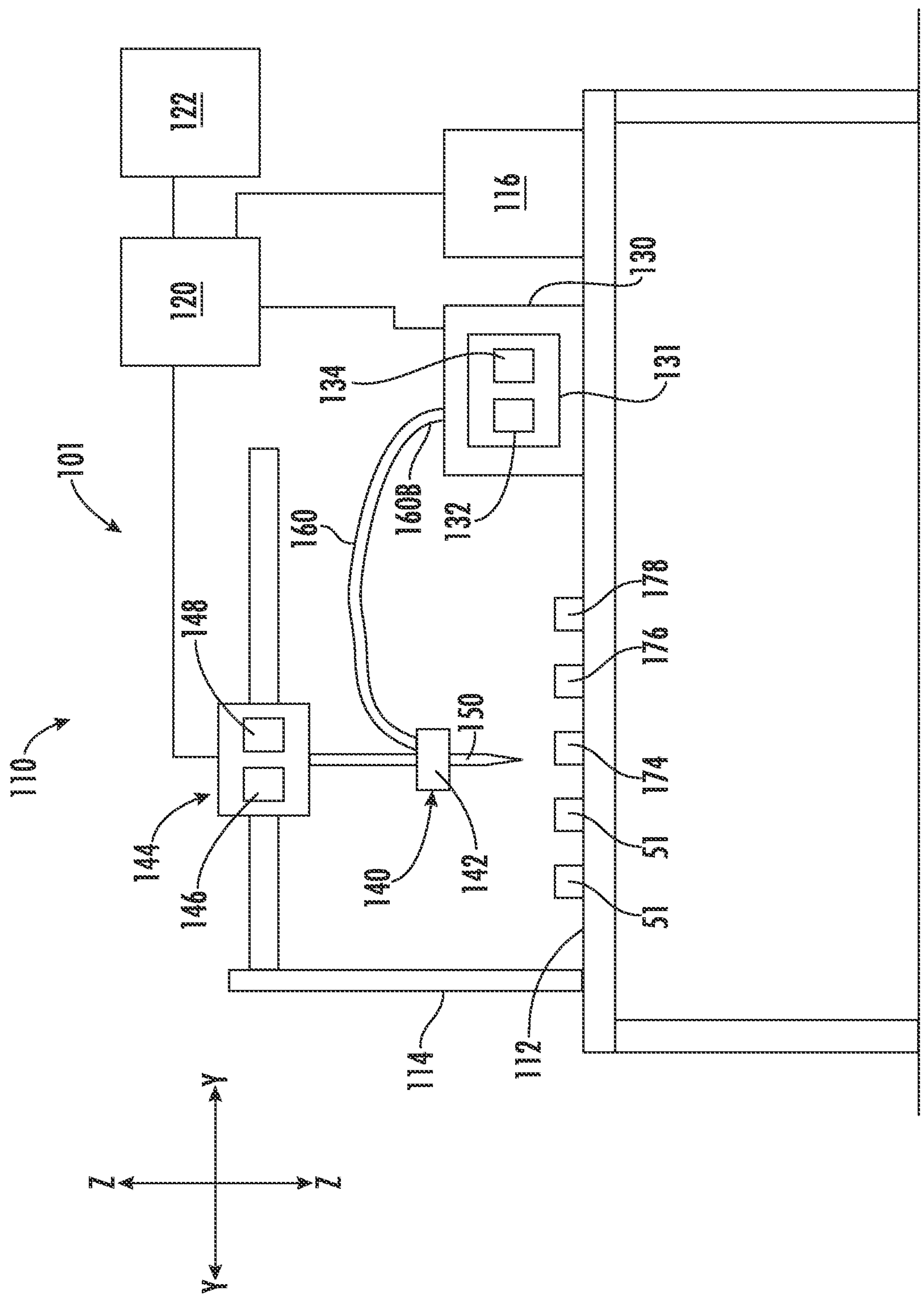
FIG. 3 is a front view of an illustrative automated liquid handling system including a liquid mixing system according to embodiments of the technology.

With reference to FIG. 3, an example liquid mixing system 101 according to certain embodiments of the present technology is shown therein. The illustrated liquid mixing system 101 forms a part of an automated liquid handling system 110 according to the illustrated embodiments of the present technology. However, it shall be understood that the disclosed methods, systems, and apparatus may form a part of or be used with liquid handling systems of other designs. The liquid mixing system 101 is configured to mix two of more liquids within the liquid handling system 110. The liquid mixing system 101 and the liquid handling system 110 may be used and configured to execute or conduct methods as described above with reference to FIGS. 1 and 2.

Figure 4:
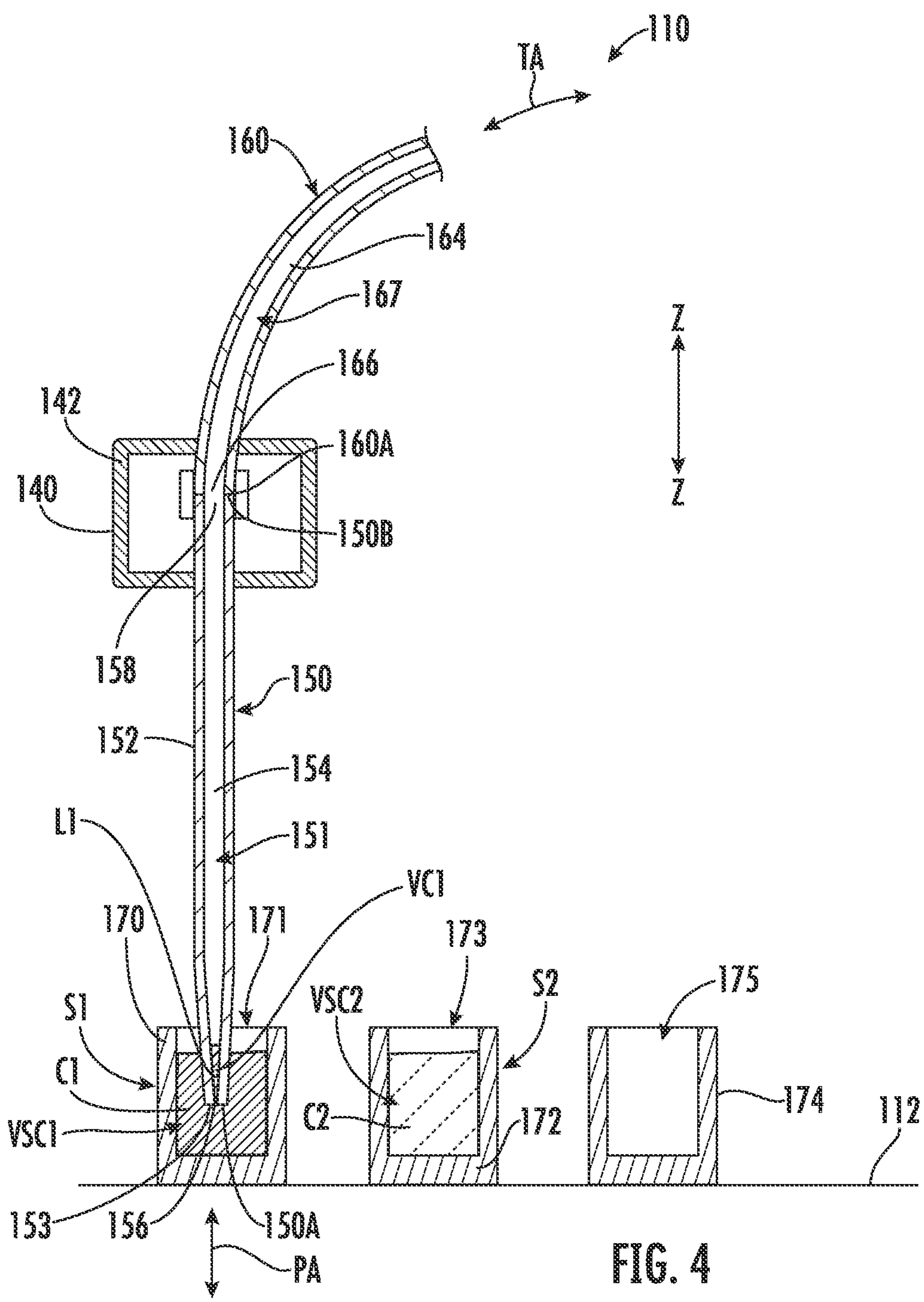
FIGS. 4-8 are fragmentary, cross-sectional views of the automated liquid handling system of FIG. 3 illustrating a process for mixing two liquids.

In some embodiments, the liquid handling system 110 includes a first liquid supply S1 and a second liquid supply S2. The first liquid supply S1 includes a volume VSC1 of a first liquid C1, and the second liquid supply S2 includes a volume VSC2 of a second liquid C2 as discussed below (FIG. 4). The liquid mixing system 101 is operated to mix quantities of the first liquid C1 and the second liquid C2 with one another to form a mixture liquid M (FIG. 11) of the component liquids C1 and C2. In some embodiments, the second liquid C2 is different from the first liquid C1 (e.g., the component liquids C1, C2 are different from one another in their chemical compositions and/or viscosities).

With reference to FIG. 3, the illustrated automated liquid handling system 110 includes a platform or deck 112, a frame 114, an analytical instrument 116, a controller 120, and a liquid handler 130. In some embodiments, the automated liquid handling system 110 is a robotic automated liquid handling system.

For the purpose of discussion and as indicated in the figures, the workspace defines a Z-axis corresponding to vertical, and orthogonal X- and Y-axes that together define a horizontal plane.

In the illustrated embodiment and with reference to FIG. 4, the first liquid supply S1 includes a container 170 having a receptacle or reservoir 171 containing the volume VSC1 of the first liquid C1. The second liquid supply S2 includes a container 172 having a receptacle or reservoir 173 containing the volume VSC2 of the first liquid C2. It will be appreciated that the liquid supplies S1, S2 may take any suitable form. For example, the containers 170, 172 may be separate containers or a single container including both reservoirs 171, 173 (e.g., a multi-well plate). By way of further example, the containers 170, 172 may be vessels having open tops or vials having closures (e.g., septa) permitting access to their contents. Either or both of the liquid supplies S1, S2 may include more than one reservoir containing the respective liquid C1, C2.

Figure 12:
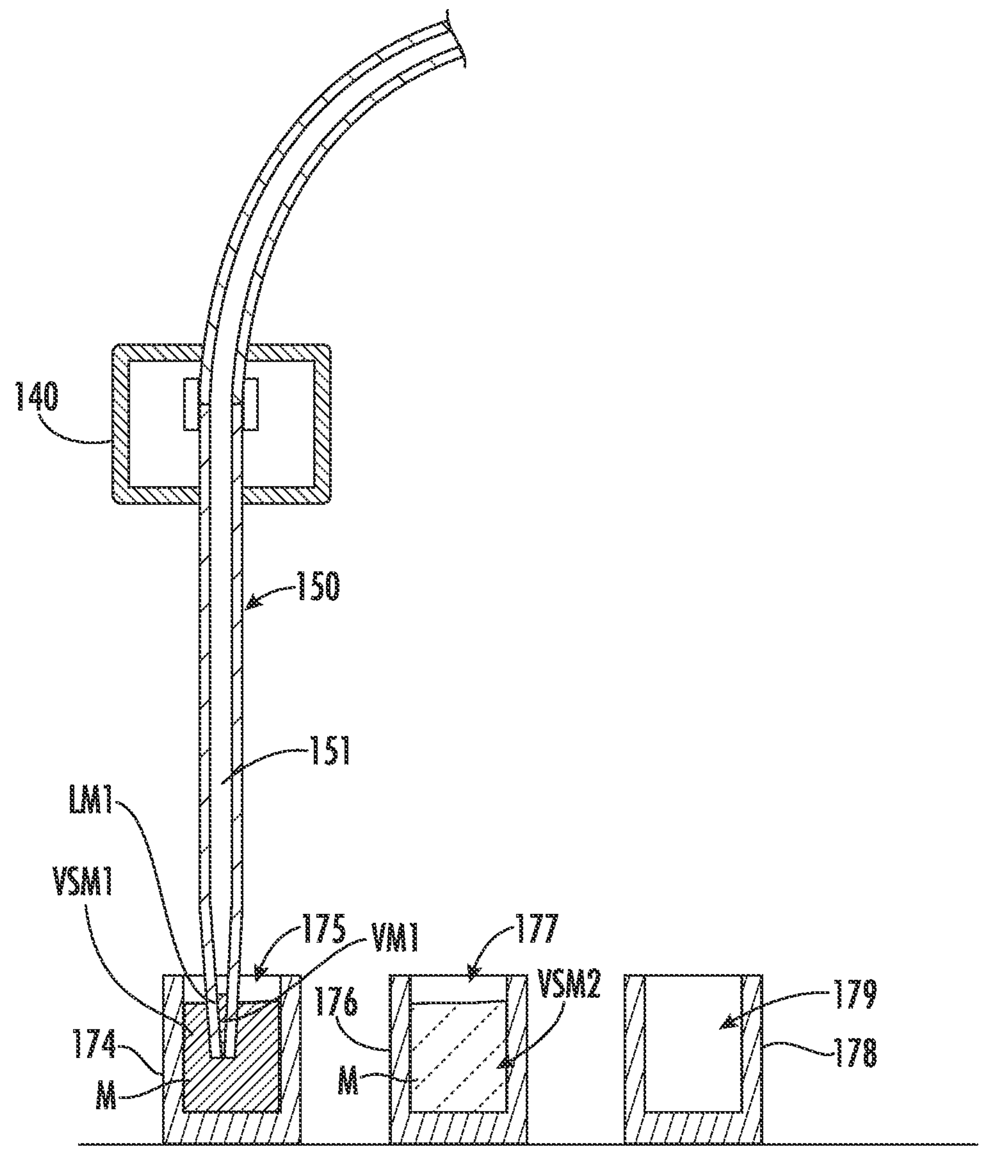

In some embodiments, the liquid handling system 110 further includes one or more mixture receiving containers 174 (FIGS. 4 and 12), 176 (FIG. 12) each having a receptacle or reservoir 175, 177 (FIG. 12). As discussed below, the mixture liquid M may be dispensed into the reservoir(s) 175, 177.

Figure 16:
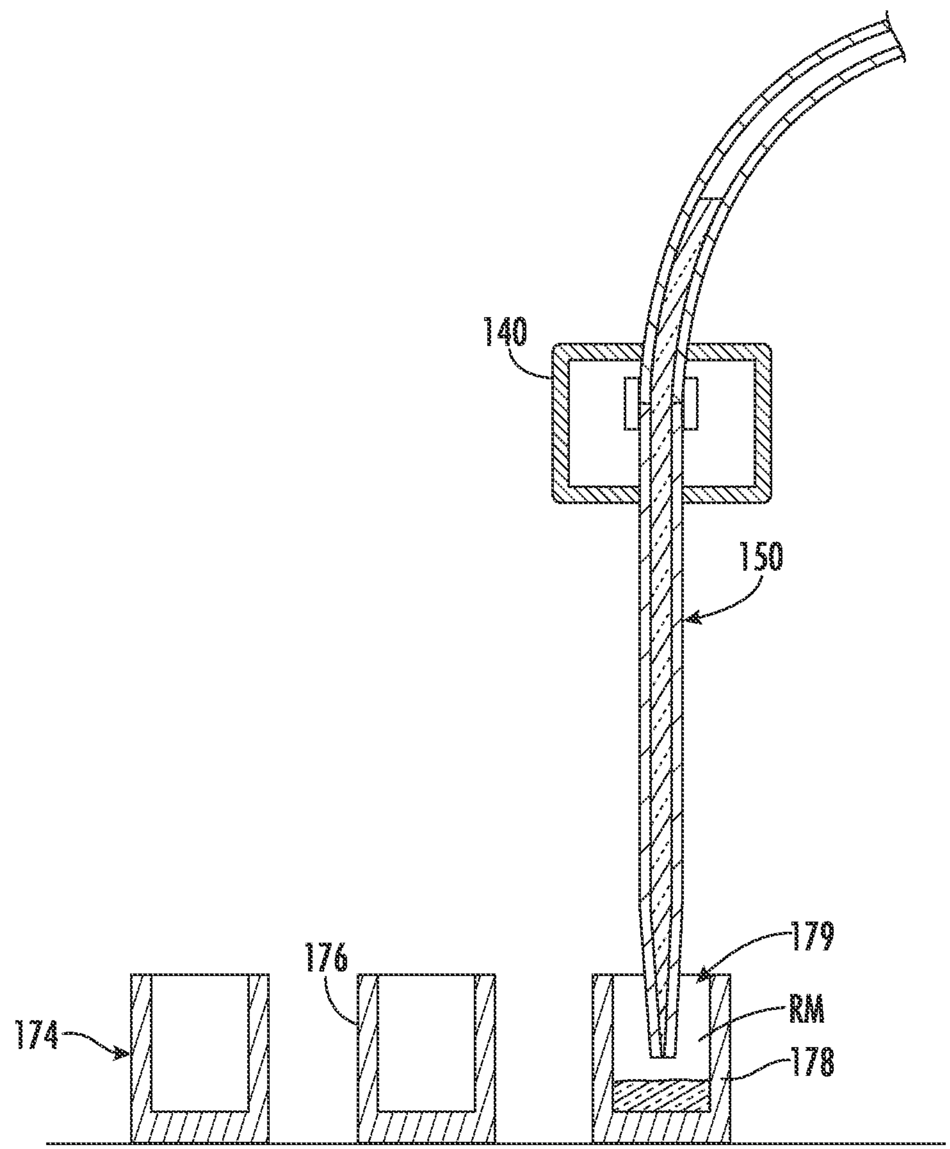

In some embodiments, the liquid handling system 110 further includes one or more re-mixture receiving containers 178 each having a receptacle or reservoir 179 (FIG. 16). As discussed below, a re-mixed liquid may be dispensed into the reservoir(s) 179.

The liquid handler 130 (FIG. 3) includes a pressure control mechanism 131, a probe module 140, and conduit or tubing 160. The liquid handler 130 may be controlled by the controller 120.

The probe module 140 (FIG. 3) includes a probe module base 142 and a tubular probe 150 mounted thereon. The liquid handling system 110 includes a probe positioning system 144. In the illustrative embodiment, the probe positioning system 144 includes a module positioning actuator 146 and a probe positioning actuator 148. The module positioning actuator 146 is operable by the controller 120 to move the probe module 140 along the X and Y axes relative to the deck 112 and the liquid supplies S1, S2. The probe positioning actuator 148 is operable by the controller 120 to raise and lower the probe 150 along the Z axis relative to the deck 112 and the liquid supplies St S2. However, one of ordinary skill would recognize that any suitable positioning system may be used for moving the probe 150 relative to the liquid supplies S1, S2. The probe module positioning actuator 146 and the probe positioning actuator 148 may include electric motors, for example.

The pressure control mechanism 131 (FIG. 3) is fluidly coupled to the probe 150 by the tubing 160. The pressure control mechanism 131 includes a pump 132 and a pump actuator 134. The pump actuator 134 is operable by the controller 120 to drive the pump 132.

The pump 132 may be any suitable type of pump. In some embodiments, the pump 132 is a syringe pump.

The pump actuator 134 may be any suitable type of force actuator. In some embodiments, the pump actuator 134 is an electrically powered actuator. In some embodiments, the pump actuator 134 is an electrically powered linear actuator.

With reference to FIG. 4, the illustrative probe 150 has a distal end 150A and a proximal end 150B. The probe 150 includes an elongate body 152 having a tip 153 at the distal end 150A. A probe lumen or passage 154 extends axially through the probe 150, along a probe lengthwise axis PA, from a probe inlet 156 (at the tip 153) to a probe proximal port 158 (at the proximal end 150B). In some embodiments, the probe 150 is a pipette or cannula. For example, the probe 150 may be a one-piece pipette as shown.

With reference to FIG. 4, the tubing 160 has a distal end 160A and an opposing proximal end 160B (FIG. 3). A tubing lumen or passage 164 extends axially through the tubing 160, along a tubing lengthwise axis TA (which may be curved), from a tubing inlet 166 (at the distal end 160A) to the pump 132 (at the proximal end 160B). The tubing inlet 166 is connected to the probe proximal port 158 so that the probe passage 154 and the tubing passage 164 collectively and serially form a combined passage 167. The tubing 160 may be a flexible tubing.

The mixing system 101 includes the controller 120, the pressure control mechanism 131, the probe 150, and a mixing volume 151 (FIG. 4). In some embodiments, the mixing volume 151 is defined by the probe passage 154 and/or the tubing passage 164.

Exemplary operation of a system 110 and liquid mixing system 101 in accordance with methods of the present technology will now be described with reference to FIGS. 4-11. It will be appreciated that the following procedure is exemplary and may be modified depending on the desires of the operator. All or some of these operations may be executed by the controller 120.

The liquid supplies S1, S2 and the mixture receiving container(s) 174, 176 are provided on the deck, for example. The liquid supplies S1, S2 may be placed in position manually or automatically and programmatically by the controller 120.

The probe module positioning system 144 moves the probe module 140 into vertical alignment or registry with the reservoir 171 of the first liquid supply S1. The probe module positioning system 144 then lowers the tip 153 of the probe 150 into the volume VSC1 of the first liquid C1 in the reservoir 171 as shown in FIG. 4. The pump actuator 134 is then operated to drive the pump 132 to generate a vacuum or negative pressure in the probe passage 154 to aspirate a desired or prescribed volume VC1 of the first liquid C1 from the volume VSC1 into the probe passage 154 through the probe inlet 156. The aspirated volume VC1 forms a first layer L1 in the mixing volume 151 as shown in FIG. 4.

Figure 5:
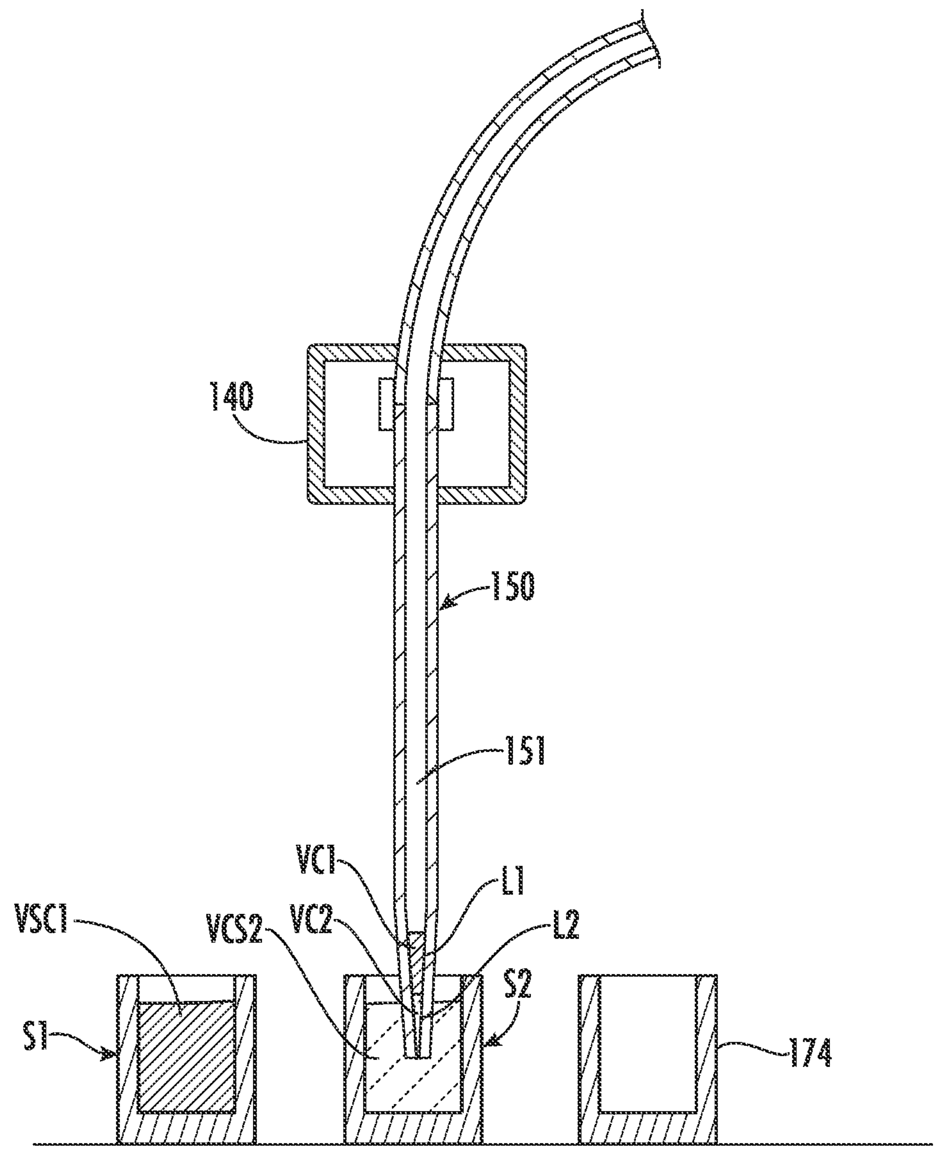

The probe module positioning system 144 then raises the tip 153 out of the reservoir 171 and moves the probe module 140 into vertical alignment or registry with the reservoir 173 of the second liquid supply S2. The probe module positioning system 144 then lowers the tip 153 of the probe 150 into the volume VSC2 of the second liquid C2 in the reservoir 173 as shown in FIG. 5. The pump actuator 134 is then operated to drive the pump 132 to generate a vacuum or negative pressure in the probe passage 154 to aspirate a desired or prescribed volume VC2 of the second liquid C2 from the volume VSC2 into the probe passage 154 through the probe inlet 156. The aspirated volume VC2 forms a second layer L2 in the mixing volume 151 as shown in FIG. 5.

Figure 6:
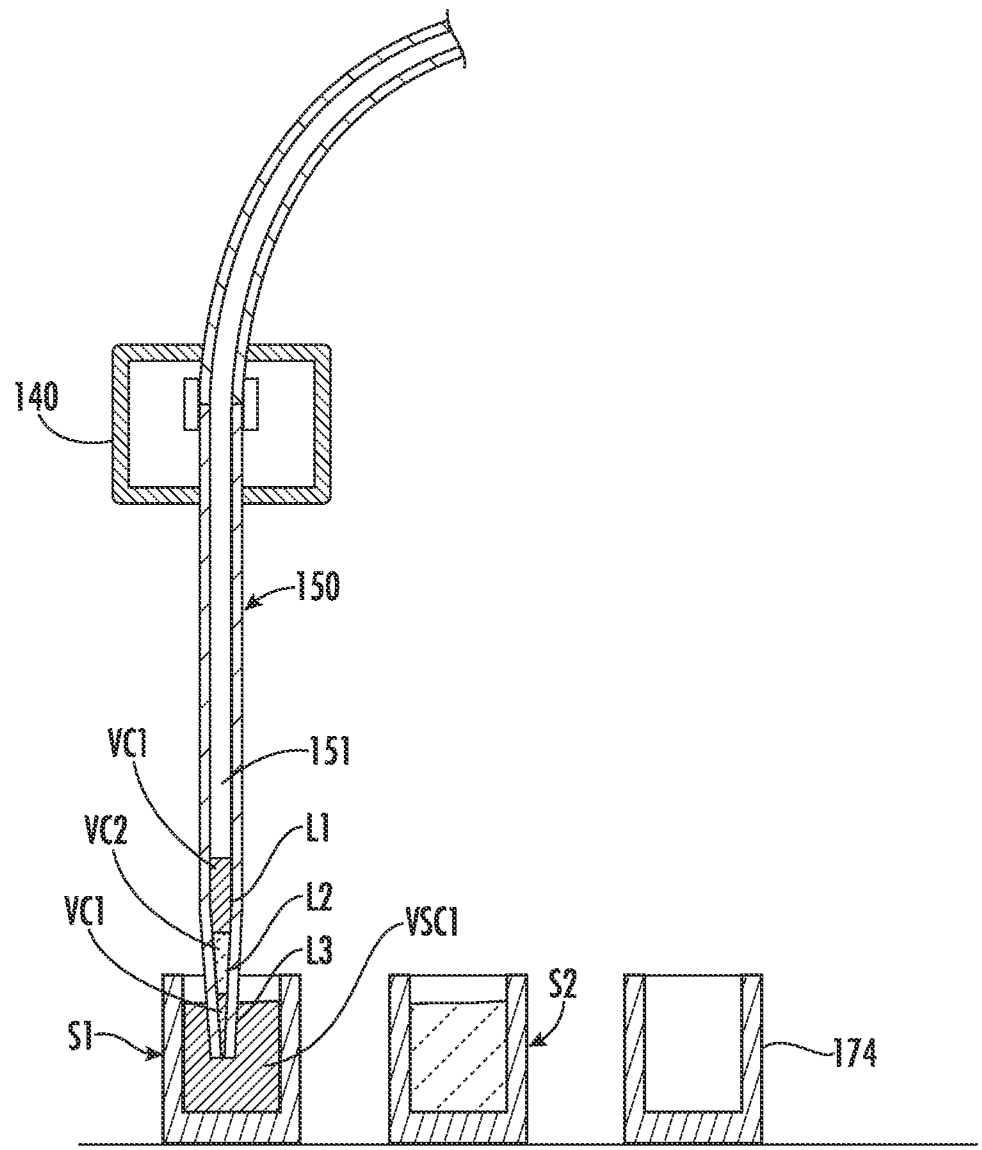

In some embodiments, the probe module positioning system 144 then raises the tip 153 out of the reservoir 173 and moves the probe module 140 into vertical alignment or registry with the reservoir 171 of the first liquid supply S1. The probe module positioning system 144 then lowers the tip 153 of the probe 150 into the volume VSC1 of the first liquid C1 in the reservoir 171 as shown in FIG. 5. The pump actuator 134 is then operated to drive the pump 132 to generate a vacuum or negative pressure in the probe passage 154 to aspirate a desired or prescribed volume VC1 of the first liquid C1 from the volume VSC1 into the probe passage 154 through the probe inlet 156. The aspirated volume VC1 forms a third layer L3 in the mixing volume 151 as shown in FIG. 6.

Figure 7:
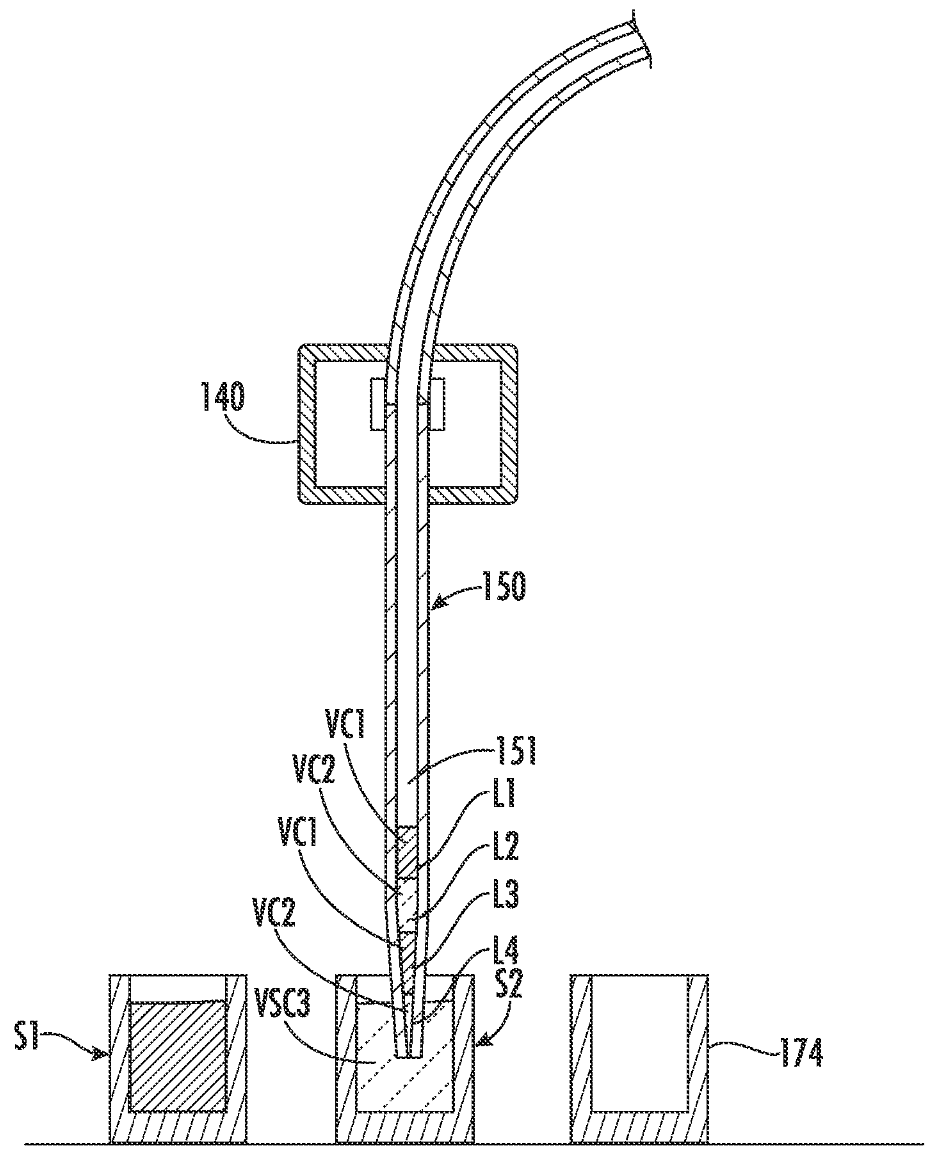

In some embodiments, the probe module positioning system 144 then raises the tip 153 out of the reservoir 171 and moves the probe module 140 into vertical alignment or registry with the reservoir 173 of the second liquid supply S2. The probe module positioning system 144 then lowers the tip 153 of the probe 150 into the volume VSC3 of the second liquid C2 in the reservoir 173 as shown in FIG. 7. The pump actuator 134 is then operated to drive the pump 132 to generate a vacuum or negative pressure in the probe passage 154 to aspirate a desired or prescribed volume VC2 of the second liquid C2 from the volume VSC2 into the probe passage 154 through the probe inlet 156. The aspirated volume VC2 forms a fourth layer L4 in the mixing volume 151 as shown in FIG. 7.

The foregoing may be repeated as desired to progressively form additional alternating layers of volumes VC1, VC2 of the first liquid C1 and the second liquid C2 from the liquid supplies S1, S2. That is, the probe module positioning system 144 is used to repeatedly and alternatingly place the probe tip 153 in the liquid supplies S1 and S2, and a respective volume VC1 and VC2 is aspirated during each placement, to stack additional layers of the liquids C1, C2 under the previously aspirated layers. These acts may be continued until a desired number of layers are formed or a desired total volume has been aspirated into the mixing volume 151.

Figure 8:
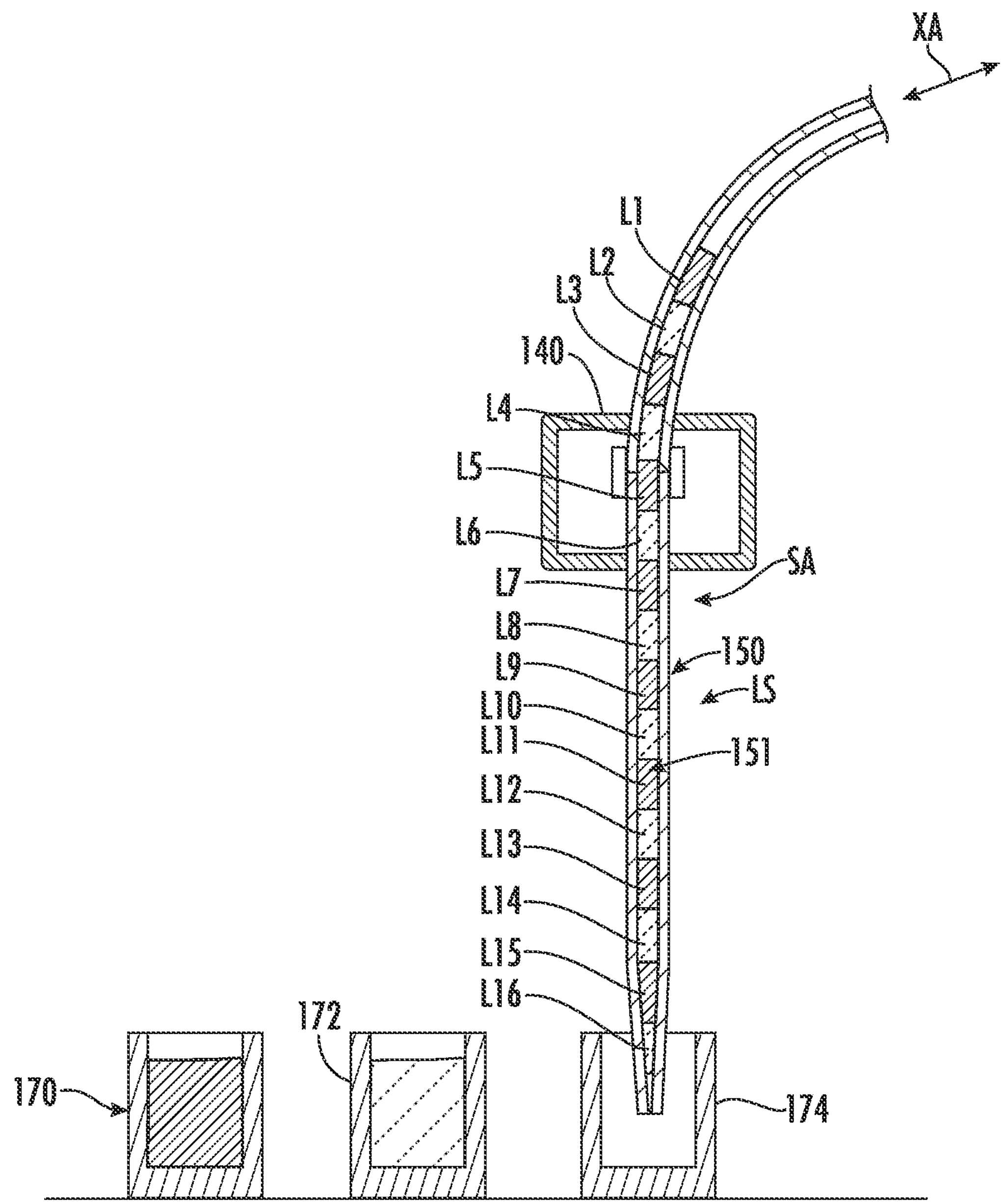

With reference to FIG. 8, the aspirated liquid volumes VC1, VC2 form a liquid stack LS in the mixing volume 151. The liquid stack LS includes a series SA of alternating, interfacing layers L1-L16 of the first liquid C1 and the second liquid C2. The mixing volume 151 is elongate and the layers L1-L16 are stacked along a lengthwise axis XA (which may be curved) of the mixing volume 151 (i.e., the layers L1-L16 are stacked along the probe lengthwise axis PA and the tubing lengthwise axis TA). The layers L1-L16 may also be referred to herein as layers L.

Figure 9:
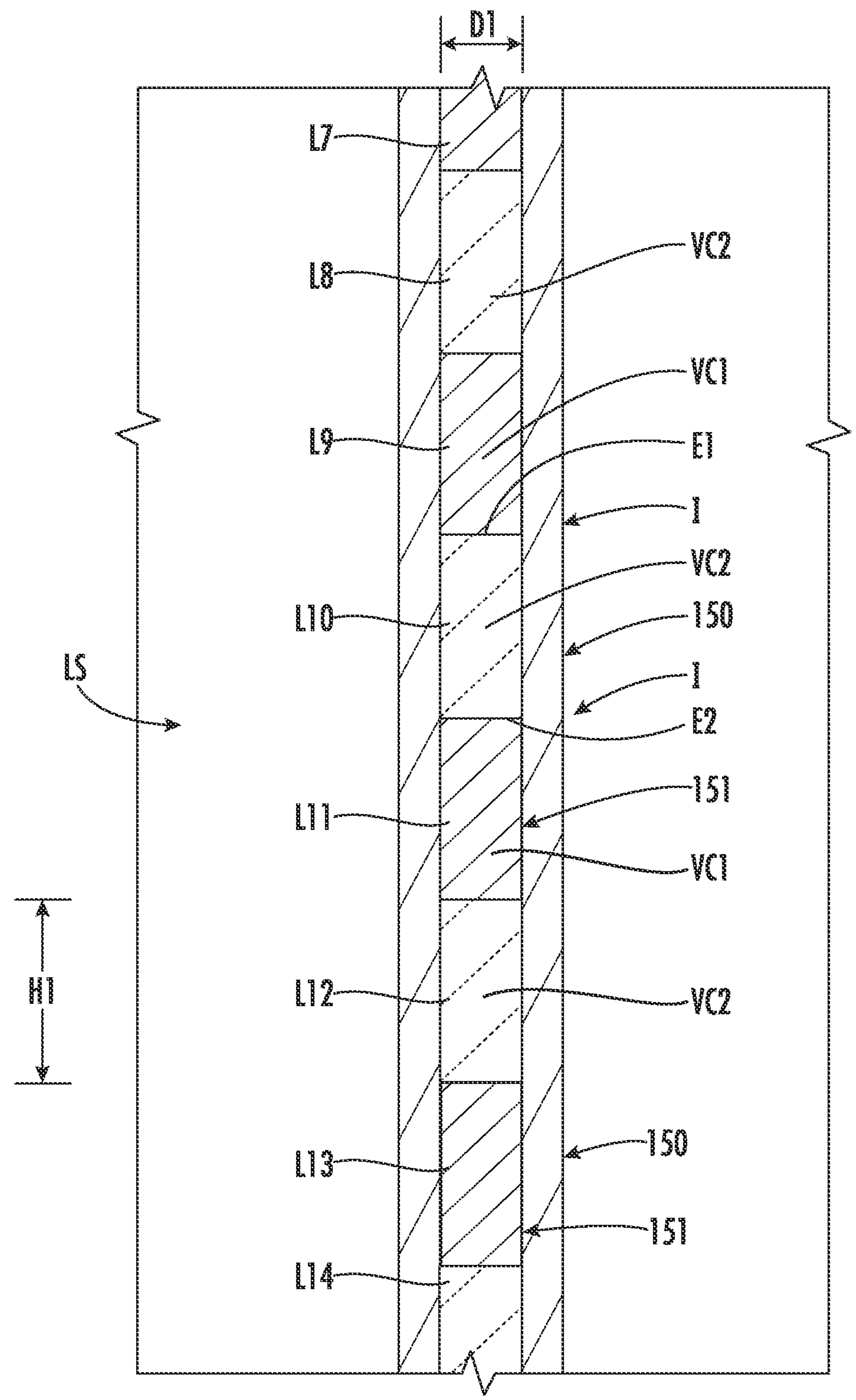
FIG. 9 is an enlarged, fragmentary, cross-sectional view of a probe of the automated liquid handling system of FIG. 3 containing a layered liquid stack.

As shown in FIG. 9, each layer L1-L16 is disposed immediately adjacent and in flush contact with the layers above and below it at layer interfaces I. The liquid volume VC1, VC2 of each layer L1-L16 has opposed end interface surfaces E1, E2 (except for the endmost layers, which have only one interface surface). The upper interface surface E1 of each layer contacts the lower interface surface E2 of the preceding layer at an interface I. That is, there are no intervening layers between adjacent layers L1-L16 of the liquids C1, C2. However, the boundaries between the aspirated liquid volumes VC1, VC2 may not be discrete, because the drawing of the liquid volumes VC1, VC2 through the passages 154, 164 may cause some agitation of the liquid volumes VC1, VC2 that mixes the liquid volumes VC1, VC2 with one another at their interfaces.

The liquid volume VC1, VC2 of each layer L1-L16 is allowed to diffuse into the liquid volume VC1, VC2 of each layer L1-L16 abutting it at the associated interfaces I while the layers L1-L16 are present in the mixing volume 151. This diffusion serves to physically mix the adjacent liquid volumes VC1, VC2 with one another to form therefrom a mixture liquid M in the mixing volume 151, as illustrated in FIG. 10.

Figure 10:
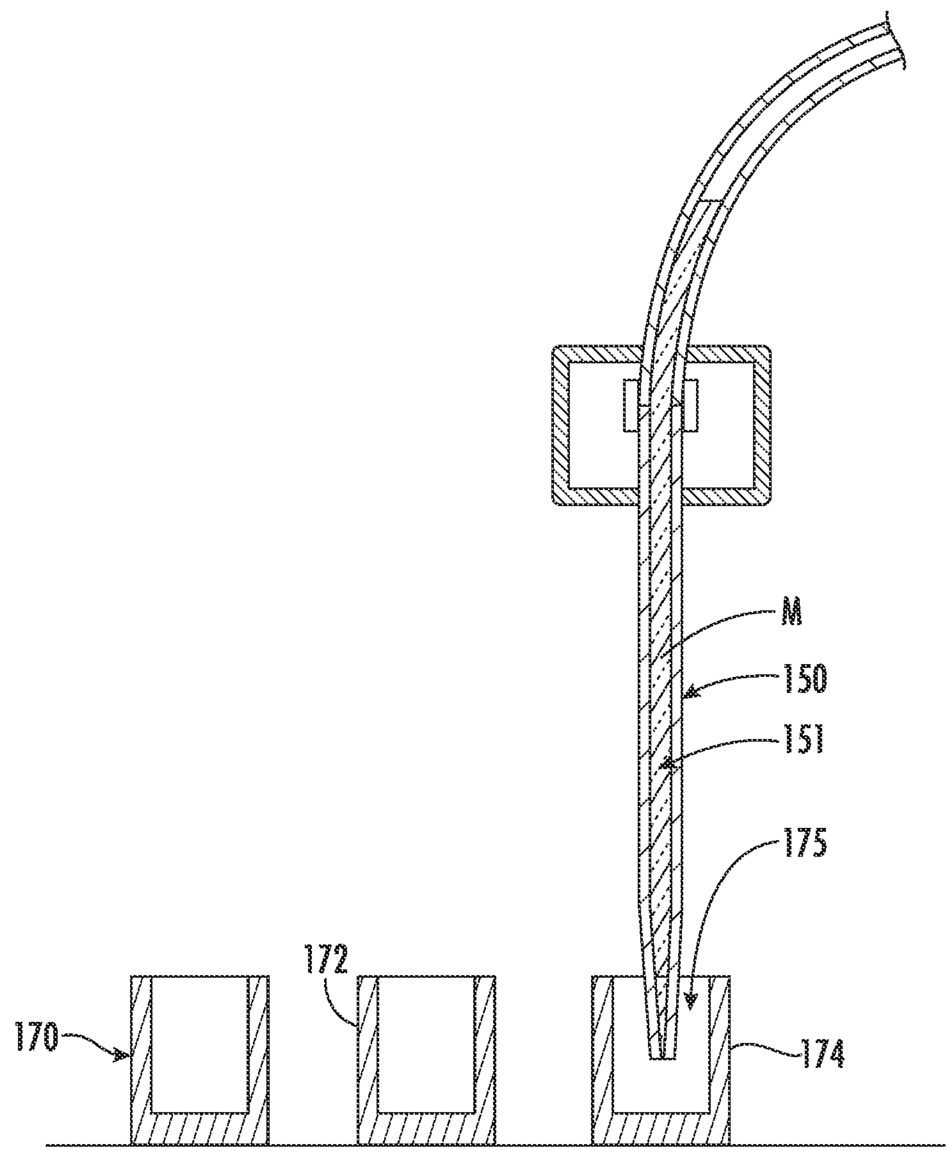
FIGS. 10-16 are fragmentary, cross-sectional views of the automated liquid handling system of FIG. 3 illustrating further steps of the process for mixing the two liquids.
Figure 11:
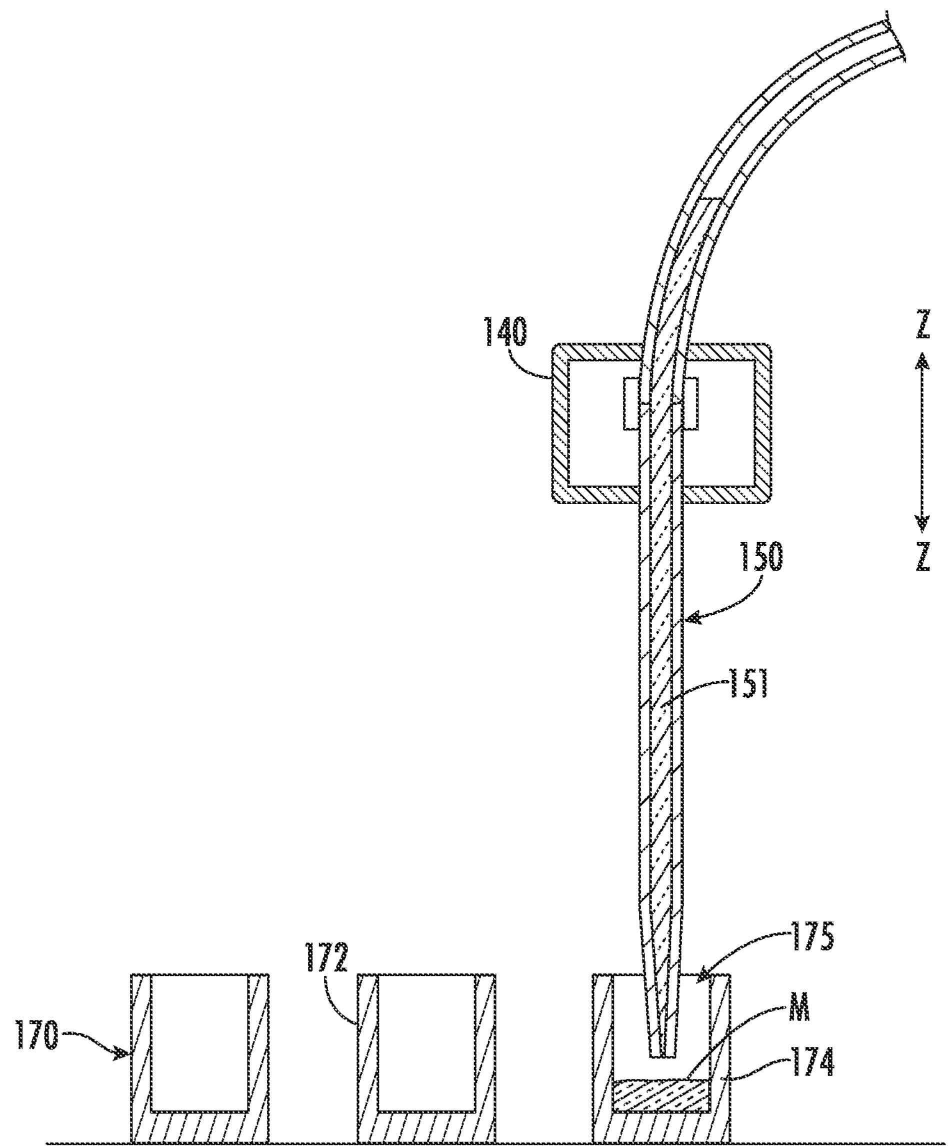

The probe module positioning system 144 moves the probe module 140 into vertical alignment or registry with the reservoir 175 of the container 174 as shown in FIG. 10. The probe module positioning system 144 may lower the tip 153 of the probe 150 into the or adjacent the reservoir 175. The pump actuator 134 is then operated to drive the pump 132 to generate a positive pressure in the probe passage 154 to dispense a desired or prescribed volume of the mixture liquid M from the mixing volume 151 into the reservoir 175 as shown in FIG. 11. The mixture liquid M thereafter be used or further processed as desired.

It will be appreciated that the container 174 is only one example of a repository for the dispensed mixture liquid. For example, the mixture liquid M may be dispensed into an injector (e.g., of a gas chromatography device) or into a reservoir containing another liquid.

The liquid stack LS may be retained in the mixing volume 151 for a period of time (retention time) between completion of the formation of the liquid tack LS and the dispensing of the mixture liquid M from the probe 150, thereby allowing the liquid volumes VC1, VC2 of the layer L1-L16 to diffuse as described. The retention time may be a predetermined or prescribed minimum time period. In some embodiments, all of the layers of the liquid stack LS are permitted to diffuse with their adjacent interfacing layers for a least 4 seconds. In some embodiments, all of the layers of the liquid stack LS are permitted to diffuse at their adjacent interfacing layers for a residence time or diffusion mixing time in the mixing volume 151 in the range of from about 4 to 100 seconds.

While FIG. 8 shows a liquid stack LS including sixteen layers L, one of ordinary skill would recognize that a liquid stack in accordance with embodiments may include more or fewer layers. In some embodiments, the liquid stack includes at least three layers of the first liquid C1 and at least two layers of the second liquid C2.

In some embodiments, each layer L has a liquid volume in the range of from about 1 microliter to 100 microliters. In some embodiments, each layer L has a microfluidic liquid volume in the range of from about 3 microliters to 25 microliters.

The layers of the first liquid C1 may have different volumes that the layers of the second liquid C2 (i.e., the liquid handler 130 may sip or aspirate different volumes of the liquids C1, C2).

In some embodiments, the total volume of the first liquid in the liquid stack LS is substantially equal to the total volume of the second liquid in the liquid stack LS.

In some embodiments, the total volume of the first liquid in the liquid stack LS is different than the total volume of the second liquid in the liquid stack LS.

In some embodiments, each layer L has a layer diameter Dl (FIG. 9) to layer height H1 (FIG. 9) ratio of at least 0.016.

In some embodiments, the ratio of the area of each interface surface E1, E2 (FIG. 9) of each layer to the liquid volume of the layer is at least 0.02 l/mm.

In some embodiments, the amounts of the liquids C1, C2 in the liquid supplies S1, S2 are selected to provide desired volumetric proportions of the liquids C1, C2 in the mixture liquid M. The layered volumes VC1, VC2 are then alternatingly sipped or aspirated as described until each supply volume VSC1, VSC2 has been fully aspirated into the mixing volume 151.

In some embodiments and with reference to FIGS. 12-16, the mixture liquid M may be remixed after being dispensed from the probe 150 in order to achieve a more complete and uniform physical mixing of the liquids C1, C2. In this case, a portion (volume VSM1) of the mixture liquid M is dispensed from the mixing volume 151 into the reservoir 175 using the pump 132 as described above, and another portion (volume VSM2) of the mixture liquid M is dispense from the mixing volume 151 into a second reservoir 176 (of the container 174 or another container, for example) using the pump 132.

The probe module positioning system 144 moves the probe module 140 into vertical alignment or registry with the reservoir 175 and lowers the tip 153 of the probe 150 into the volume VSM1 as shown in FIG. 12. The pump actuator 134 is then operated to drive the pump 132 to generate a vacuum or negative pressure in the probe passage 154 to aspirate a desired or prescribed volume VM1 of the volume VSM1 into the probe passage 154 through the probe inlet 156. The aspirated volume VM1 forms a first layer LM1 in the mixing volume 151 as shown in FIG. 12.

Figure 13:
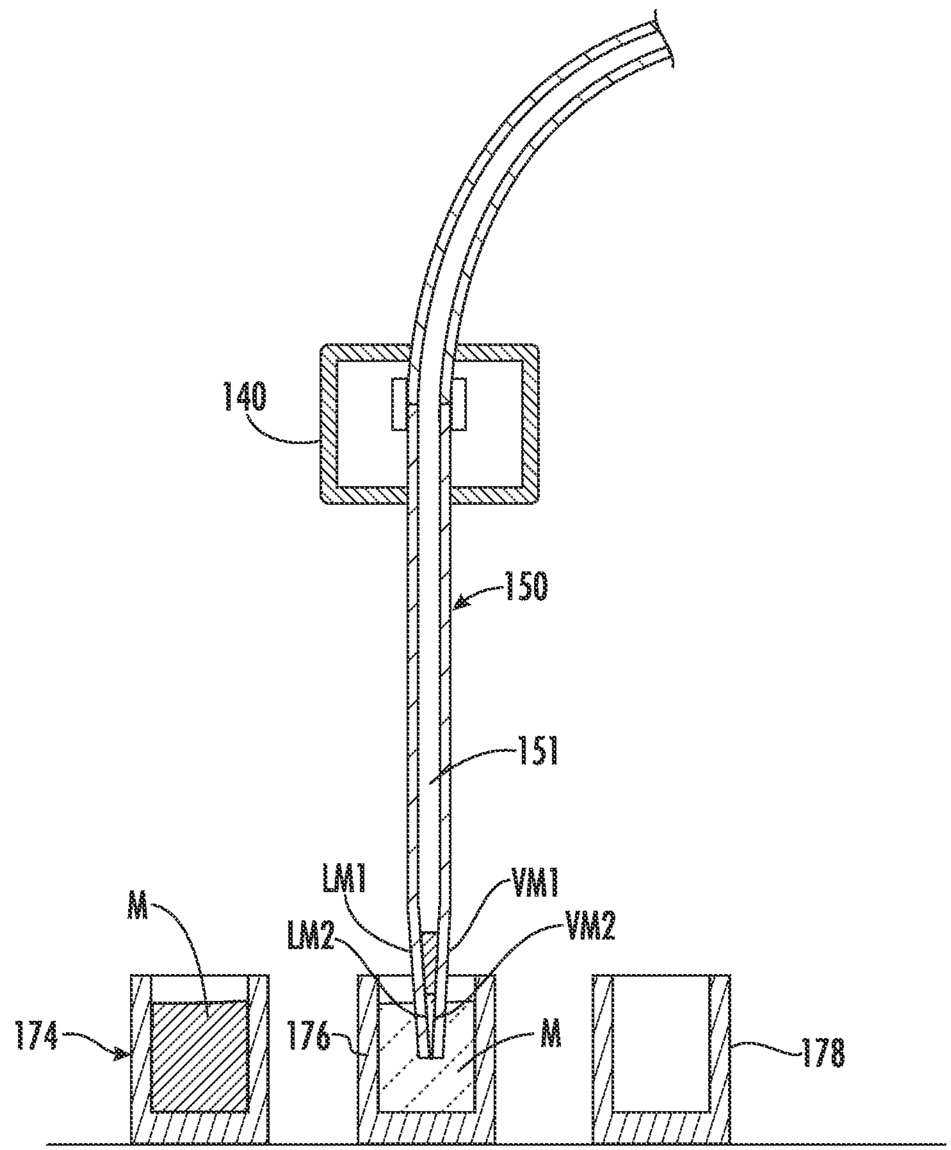

The probe module positioning system 144 then raises the tip 153 out of the reservoir 175, moves the probe module 140 into vertical alignment or registry with the reservoir 176, and lowers the tip 153 of the probe 150 into the volume VSM2 as shown in FIG. 13. The pump actuator 134 is then operated to drive the pump 132 to generate a vacuum or negative pressure in the probe passage 154 to aspirate a desired or prescribed volume VM2 from the volume VSM2 into the probe passage 154 through the probe inlet 156. The aspirated volume VM2 forms a second layer LM2 in the mixing volume 151 as shown in FIG. 13.

In the same manner as described for formation of the liquid stack LS, the foregoing may be repeated as desired to progressively form additional alternating layers of volumes VM1, VM2 of the mixture liquid M from the liquid supplies VSM1, VSM2. That is, the probe module positioning system 144 is used to repeatedly and alternatingly place the probe tip 153 in the mixture liquid volumes VSM1, VSM2 in the reservoirs 175, 176, and a respective volume VM1 and VM2 is aspirated during each placement, to stack additional layers of the mixture liquid under the previously aspirated layers. These acts may be continued until a desired number of layers are formed or a desired total volume has been aspirated into the mixing volume 151.

Figure 14:
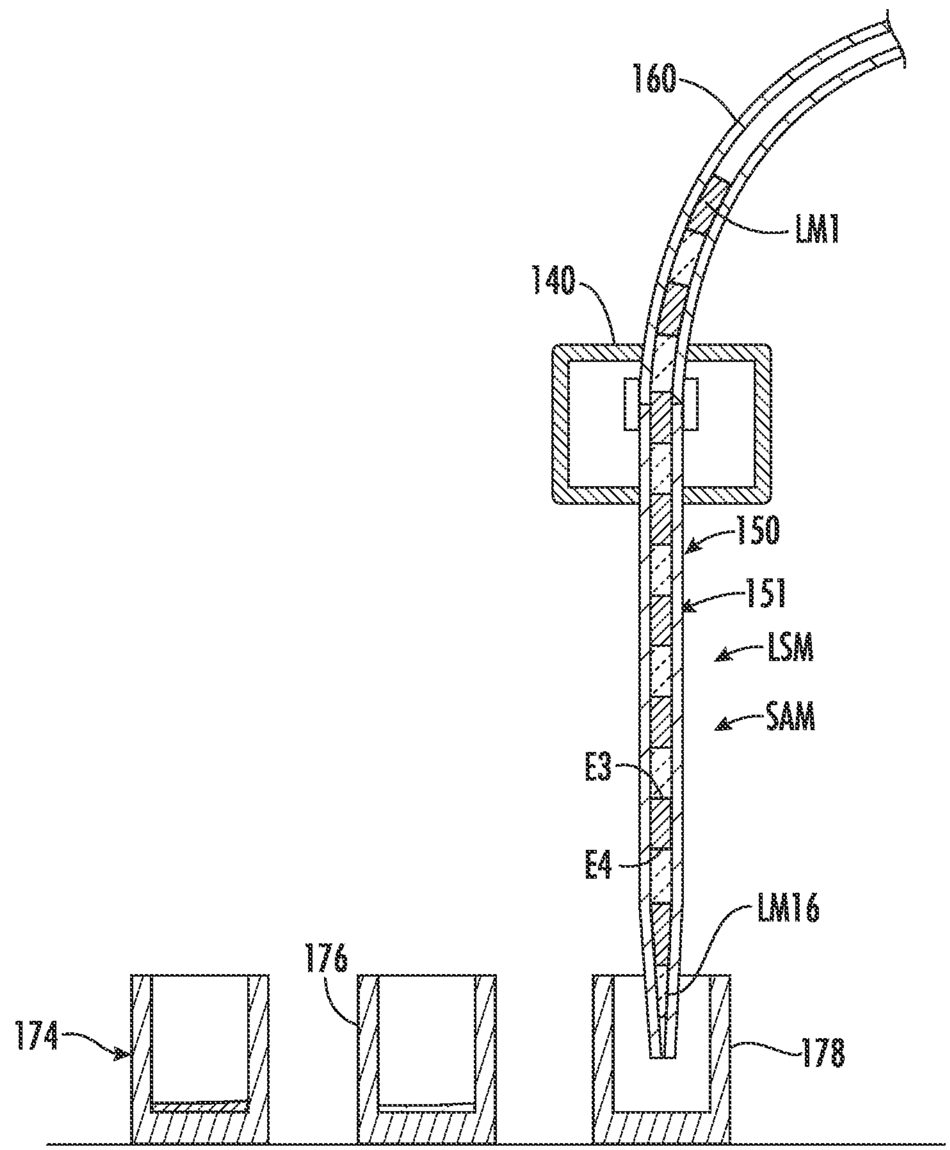

With reference to FIG. 14, the aspirated liquid volumes VM1, VM2 form a liquid stack LSM in the mixing volume 151. The liquid stack LSM includes a series SAM of alternating, interfacing layers LM1-LM16 (which may be referred to herein generally as layers LM) of the first liquid VM1 and the second liquid VM2. Each layer LM1-LM16 is disposed immediately adjacent and in flush contact with the layers above and below it at layer interfaces I. The liquid volume VM1, VM2 of each layer LM1-LM16 has opposed end interface surfaces (except for the endmost layers, which have only one interface surface). The upper interface surface of each layer contacts the lower interface surface of the preceding layer at an interface I.

The liquid volume VM1, VM2 of each layer LM1-LM16 is allowed to diffuse into the liquid volume VM1, VM2 of each layer LM1-LM16 abutting it at the associated interfaces I while the layers LM1-LM16 are present in the mixing volume 151. This diffusion serves to physically mix the adjacent liquid volumes VM1, VM2 with one another to form therefrom a mixture liquid RM in the mixing volume, as illustrated in FIG. 15.

Figure 15:
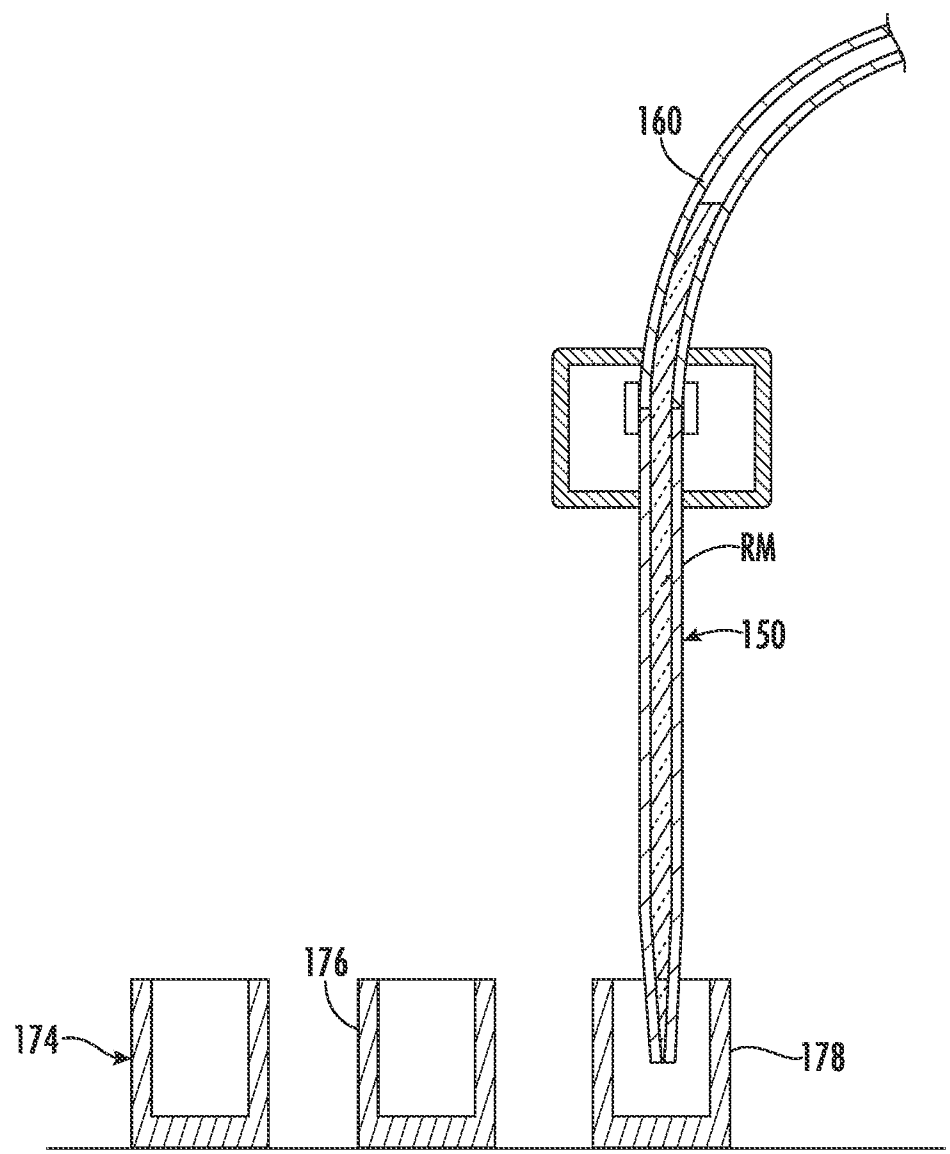

The probe module positioning system 144 moves the probe module 140 into vertical alignment or registry with a receiving reservoir 178 as shown in FIG. 15. The probe module positioning system 144 may lower the tip 153 of the probe 150 into the or adjacent the reservoir 178. The pump actuator 134 is then operated to drive the pump 132 to generate a positive pressure in the probe passage 154 to dispense a desired or prescribed volume of the re-mixture liquid RM from the mixing volume 151 into the reservoir 178 as shown in FIG. 16. The re-mixture liquid RM may thereafter be used or further processed as desired.

It will be appreciated that the reservoir 178 is only one example of a repository for the dispensed re-mixture liquid RM. For example, the re-mixture liquid RM may be dispensed into an injector (e.g., of a gas chromatography device) or into a reservoir containing another liquid.

In some embodiments, the liquid stack LSM is retained in the mixing volume 151 for a period of time (retention time) between completion of the formation of the liquid tack LSM and the dispensing the re-mixture liquid RM from the probe 150, thereby allowing the liquid volumes VM1, VM2 of layer LM1-LM16 to diffuse as described. The retention time may be a predetermined or prescribed minimum time period. In some embodiments, all of the layers of the liquid stack LSM are permitted to diffuse with their adjacent interfacing layers for a least 4 seconds. In some embodiments, all of the layers of the liquid stack LSM are permitted to diffuse with their adjacent interfacing layers for a diffusion time in the range of from about 4 to 100 seconds.

While FIG. 14 shows a liquid stack LSM including sixteen layers LM1-LM16, a liquid stack in accordance with embodiments may include more or fewer layers. In some embodiments, the liquid stack LSM includes at least three layers of the liquid VM1 and at least two layers of the liquid VM2.

In some embodiments, each layer LM of the liquid stack LSM has a liquid volume of in the range of from about 3 microliters to 25 microliters.

In some embodiments, each layer LM of the liquid stack LSM has a layer diameter to layer height ratio of at least 0.016.

In some embodiments, the ratio of the area of each interface surface E3, E4 of each layer LM of the liquid stack LSM to the liquid volume of the layer LM is at least 0.02 l/mm.

Operations described herein can be executed by or through the controller 120. The actuators 134, 146, 148 and other devices of the automated liquid handling system 110 can be electronically controlled. According to some embodiments, the controller 120 programmatically executes some, and in some embodiments all, of the aspirating, dispensing, and probe positioning described. The movements of the actuators 134, 146, 148 may be fully automatically and programmatically executed by the controller 120. The controller 120 may be provided with an HMI 122 to receive user commands.

In some embodiments, each of the aspirating and probe moving acts described above for forming the liquid stack LS are executed automatically and programmatically by the controller 120. In some embodiments, the acts described above for dispensing the mixture liquid M are executed automatically and programmatically by the controller 120.

Each of the aspirating and probe moving acts described above for forming the re-mixture liquid stack LSM may be executed automatically and programmatically by the controller 120. In some embodiments, the acts described above for dispensing the re-mixture liquid RM are executed automatically and programmatically by the controller 120.

As illustrated in FIGS. 4 and 8, the mixing volume 151 may include both a portion of the probe passage 154 and a portion of the tubing passage 164. That is, the probe passage 154 and the tubing passage 164 are used in combination as the mixing volume 151. In other embodiments, the mixing volume 151 may be defined entirely in the probe passage 154 or entirely in the tubing passage 164.

In some embodiments, the probe passage 154 has an inner diameter in the range of from about 0.1 mm to 1 mm.

In some embodiments, the tubing passage 164 has an inner diameter in the range of from about 0.5 mm to 1.5 mm.

In some embodiments, the total volume of the mixing volume 151 is in the range of from about 10 microliters to 100 microliters.

In some embodiments, the length of the mixing volume 151 is in the range of from about 20 mm to 200 mm.

In some embodiments, the ratio of the length of the mixing volume 151 to the inner diameter of the mixing volume 151 is at least 25.

Figure 17:
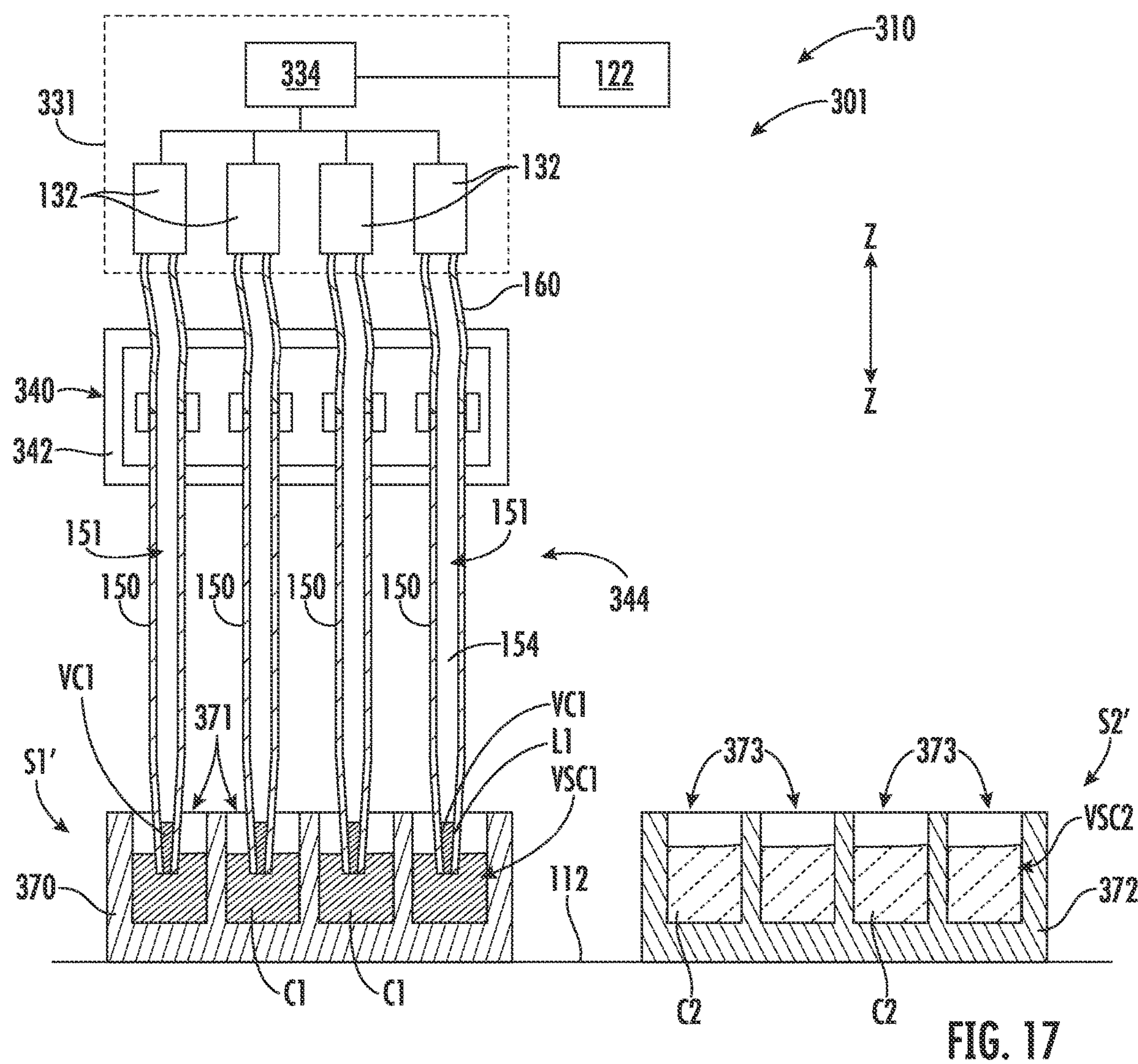
FIGS. 17-19 are fragmentary, cross-sectional views of the automated liquid handling system of FIG. 3 illustrating a process for mixing two liquids using multiple probes.
Figure 18:
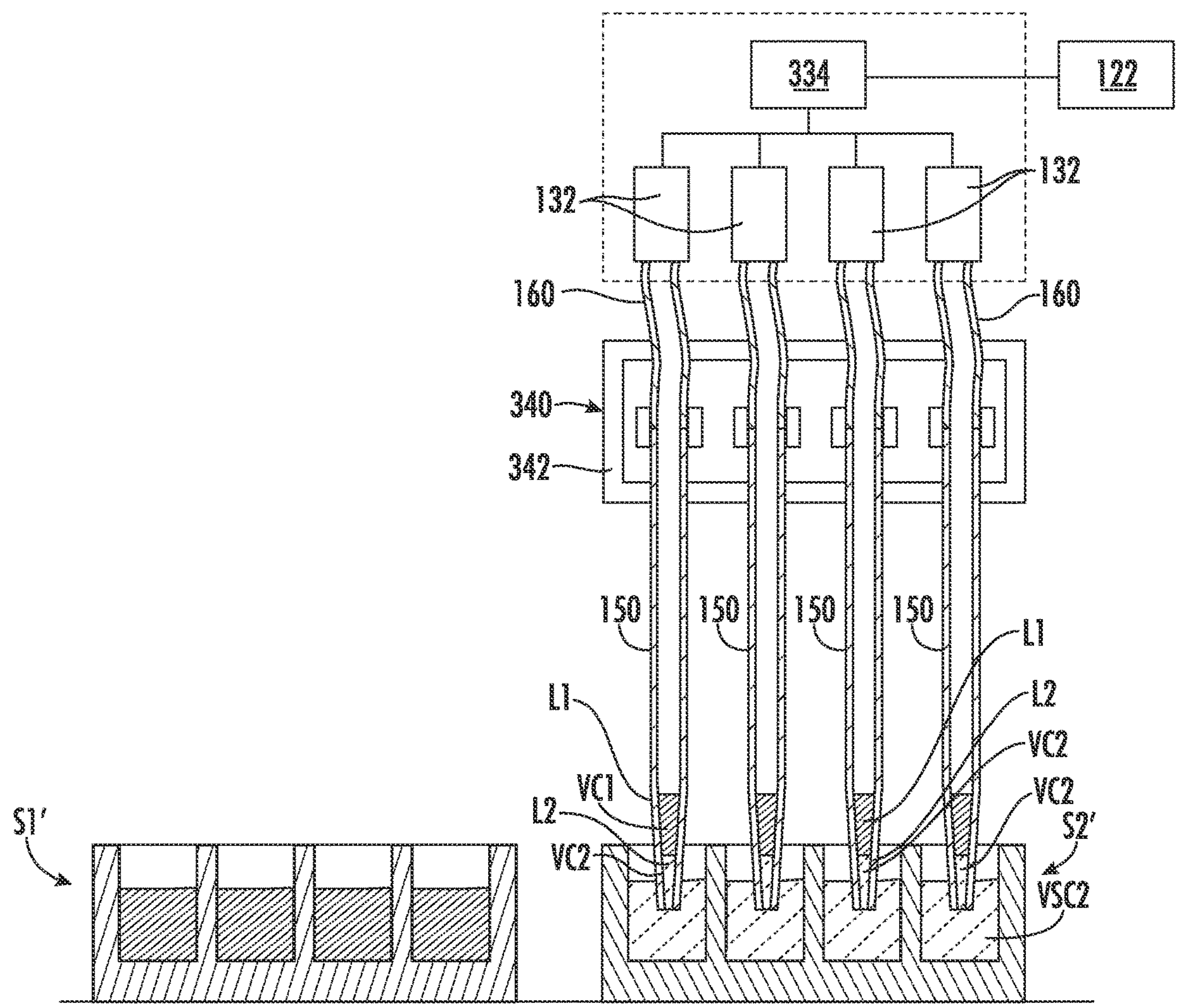
Figure 19:
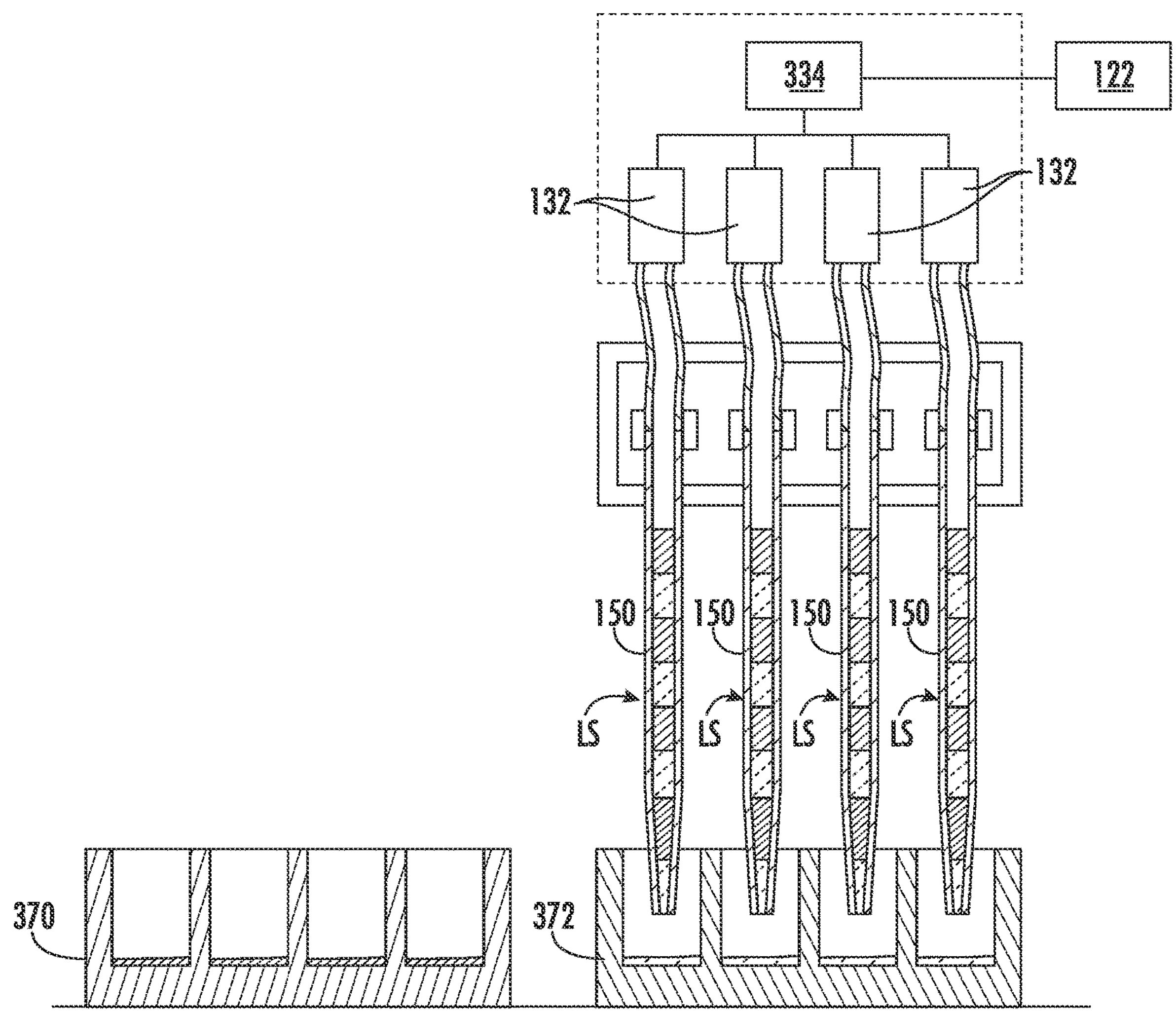

With reference to FIGS. 17-19, a liquid handling system 310 and a mixing system 301 according to further embodiments is shown therein. The liquid handling system 310 and the mixing system 301 are constructed and may be operated in the same manner as described for the liquid handling system 110 and a mixing system 101, except as discussed below. In the description of the liquid handling system 310, like components and features are referred to using the same reference numerals as used in the description of the liquid handling system 110.

The liquid handling system 110 may include a first liquid supply S1' and a second liquid supply S2' (FIG. 17). The first liquid supply S1' corresponds to the first liquid supply S1 except that the first liquid supply S1' includes a container 370 having multiple reservoirs 371, each containing a respective volume VSC1 of the first liquid C1. The second liquid supply S2' corresponds to the second liquid supply S2 except that the second liquid supply S2' includes a container 372 having multiple reservoirs 373, each containing a respective volume VSC2 of the second liquid C2.

The liquid handling system 310 includes a probe module 340 in place of the probe module 140. The probe module 340 includes a plurality of (as shown, but not limited to, four) tubular probes 150 mounted on a module base 342 for movement therewith. A probe positioning system (not shown) corresponding to the probe positioning system 144 is operable to move the probe module 340 and the probes 150 relative to the deck 112 and the reservoirs 371, 373.

The liquid handling system 310 also includes a pressure control mechanism 331 including multiple pumps 132 and a pump actuator 334. Each of the pumps 132 is fluidly coupled to a respective one of the probes 150 by a respective tubing 160.

In some embodiments, the pump actuator 334 is connected to the pumps 132 as a common pump actuator that drives the pumps 332 collectively when operated. That is, when the pump actuator 334 is actuated in one direction or mode, the pump actuator 334 thereby drives all of the pumps 132 to generate a negative or aspirating pressure in the passages 154 of the probes 150 and, when the pump actuator 334 is actuated in a second direction or mode, the pump actuator 334 thereby drives all of the pumps 132 to generate a positive or dispensing pressure in the passages 154 of the probes 150. The pump actuator 334 may drive the pumps 132 substantially simultaneously or in tandem.

In other embodiments, each pump 132 is provided with its own pump actuator that can be operated to control the associated pump 132 independently.

The liquid handling system 310 can be used in accordance with methods of the present technology in substantially the same manner as the liquid handling system 110, except that the liquid volumes VC1, VC2 are aspirated into, diffused within, and dispensed from the mixing volumes 151 of the multiple probes 150 as a group (and, in some embodiments, substantially simultaneously).

For example, as shown in FIG. 17, the probe module positioning system 344 moves the probe module 340 to place the probes 150 in vertical alignment or registry with respective ones of the reservoirs 371 and lowers the tips 153 of the probes 150 into the respective volumes VSC1. The pump actuator 334 is then operated to drive the pumps 132 to generate a vacuum or negative pressure in each probe passage 154 to aspirate a desired or prescribed volume VC1 of the volume VSC1 into the probe passage 154 of the associated probe 150 through the probe's inlet 156. The aspirated volumes VM1 form respective first layers L1 in the mixing volumes 151 of the probes 150 as shown in FIG. 17.

The probe module positioning system 344 then moves the probe module 340 to place the probes 150 in vertical alignment or registry with respective ones of the reservoirs 373, and lowers the tips 153 of the probes 150 into the respective volumes VSC2 as shown in FIG. 18. The pump actuator 334 is then operated to drive the pumps 132 to generate a vacuum or negative pressure in the each probe passage 154 to aspirate a desired or prescribed volume VC2 from the volume VSC2 into the probe passage 154 of the associated probe 150 through the probe's inlet 156. The aspirated volume VC2 forms respective second layers L2 in the mixing volumes 151 of the probes 150 as shown in FIG. 18.

In the same manner as described for formation of the liquid stack LS with reference to FIGS. 4-11, the foregoing may be repeated as desired to progressively form a respective liquid stack LS in the mixing volume associated with each probe 150 of the probe module 340. The layers of each liquid stack LS may be permitted to diffuse to form a respective mixture liquid in each mixing volume 151. The respective mixture liquids may each be dispensed from the probes 150 as described above. Moreover, the dispensed mixture liquids may be re-mixed in the several probes 150 in the same manner as described above with reference to FIGS. 12-16.

In some embodiments, the liquid handler 330 aspirates each layer L into the four probes 150 substantially simultaneously. In some embodiments, the liquid handler 330 dispenses each layer mixture liquid M (or RM) out of the four probes 150 substantially simultaneously.

It will be appreciated that in the described mixing system 301 and method, the mixing procedures in probe 150 are executed as parallel processes. The mixing system 301 can thus mix greater volumes of the liquids in a given amount of time.

Each of the foregoing aspiratoring, dispensing, and probe moving operations discussed above with reference to FIGS. 17-19 may be executed automatically and programmatically by the controller 120 as discussed above with reference to FIGS. 4-16.

While FIGS. 17-19 show a probe module including four probes 150 and liquid supplies each including four reservoirs, more or fewer probes and reservoirs may be used to perform parallel or simultaneous aspirating and mixing as described. Also, two or more of the probes 150 may aspirate from the same reservoir.

The first liquid C1 may have a different composition than the second liquid C2.

In some embodiments, the first liquid C1 has a different chemical composition than the second liquid C2.

In some embodiments, the first liquid C1 has a different viscosity than the second liquid C2. In some embodiments, one of the liquids C1, C2 has a viscosity at least fifteen percent greater than the viscosity of the other liquid C1, C2.

One or both of the first liquid C1 and the second liquid C2 may be a mixture.

In some embodiments, the first liquid C1 is a first liquid bioreactor and the second liquid C2 is a second liquid bioreactor.

In some embodiments, the liquids C1, C2 are mixed as described herein as part of a process to prepare a DNA sequencing library. In some embodiments, the liquids C1, C2 are mixed as described herein as part of a process to prepare samples for Next Generation Sequencing (NGS). In some embodiments, the first liquid C1 is a reaction mixture including DNA fragments and the second liquid C2 includes a ligase enzyme and reaction buffer.

In some embodiments, the liquids C1, C2 are mixed as described herein as part of a bioreaction. In some embodiments, the liquids C1, C2 are mixed as described herein as part of a process of SPRI bead washing. In some embodiments, the liquids C1, C2 are mixed as described herein as part of a process in DNA oligo hybridization assays.

In some embodiments, the automated liquid handling system 110 is a high throughput liquid handling system that is used to mix two liquids having different viscosities from one another. For example, in some embodiments, the automated liquid handling system 110 is high throughput liquid handling system, the first liquid C1 is a first reaction component of a process for preparing a DNA sequencing library, and the second liquid C2 is a second reaction component of the process for preparing the DNA sequencing library. The first reaction component may include DNA fragments and the second reaction component may include a ligation buffer, wherein the second reaction component has a lower viscosity than the first reaction component. In some embodiments, the first reaction component is an end repair and adenylation (ERA) reaction buffer and the second reaction component is a ligation reaction buffer. For example, in a sequencing library preparation protocol (mixing, for example, a 36 microliter ERA and a 36 microliter ligation reaction buffer), the liquid handling system 110 aspirates first 6 microliters of ERA, then 6 microliters of ligation reaction buffer, then 6 microliters of ERA, thereby forming liquid stack LS in alternating 6 microliters of ERA and ligation reaction buffer.

Various parameters may be modified or selected depending on the characteristics of the first and second liquids or other factors. These parameters may include, for example, the heights of the layers L, the retention time of the liquid stack LS in the mixing volume, the minimum diffusion time between the layers L, the number of layers L in the liquid stack LS, the total volume of the liquid stack LS, and the dimensions of the mixing volume 151 (e.g., the inner diameters of the probe passage 154 and the tubing passage 164).

Mixing procedures according to some embodiments may include additional steps. For example, the tip 153 may be dipped in a wash solution or a rinsing liquid between the aspirating steps to prevent or reduce cross-contamination of the liquid supplies S1, S2.

In some embodiments, the mixture liquid M (or the re-mixture liquid RM) may be transferred through the tubing 160 to a reservoir or device (such as the analytical instrument 116) to dispense the mixture liquid M (or the re-mixture liquid RM) from the mixing volume 151.

The containers and reservoirs as illustrated and described herein as only examples and any suitable reservoirs may be used. For example, the reservoirs for holding and receiving the liquid volumes VSC1, VSC2, VSM1, VSM2, M and RM may be or include a well plate or microwell plate including integral recesses or receptacles to directly contain liquid samples, or vials or other individual vessels (which may be seated in a tray, rack, carrier or platter).

While the probes 150 are illustrated in the figures as one-piece pipettes or cannulas, other types and configurations of tubular probes may be used. For example, each probe 150 may include a pipettor and a pipette tip removably mounted on the pipettor. In this case, the tip 153 may form a part of the pipette tip.

Systems and holders according to embodiments of the technology can be used in biochemical and chemical processing, liquid handling, and analysis of samples in laboratories, for example. The analytical instrument 116 may be any suitable apparatus or instrument.

Embodiments of the controller 120 logic may take the form of an entirely software embodiment or an embodiment combining software and hardware aspects, all generally referred to herein as a "circuit" or "module." In some embodiments, the circuits include both software and hardware and the software is configured to work with specific hardware with known physical attributes and/or configurations. Furthermore, controller logic may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or other storage devices.

Figure 20:
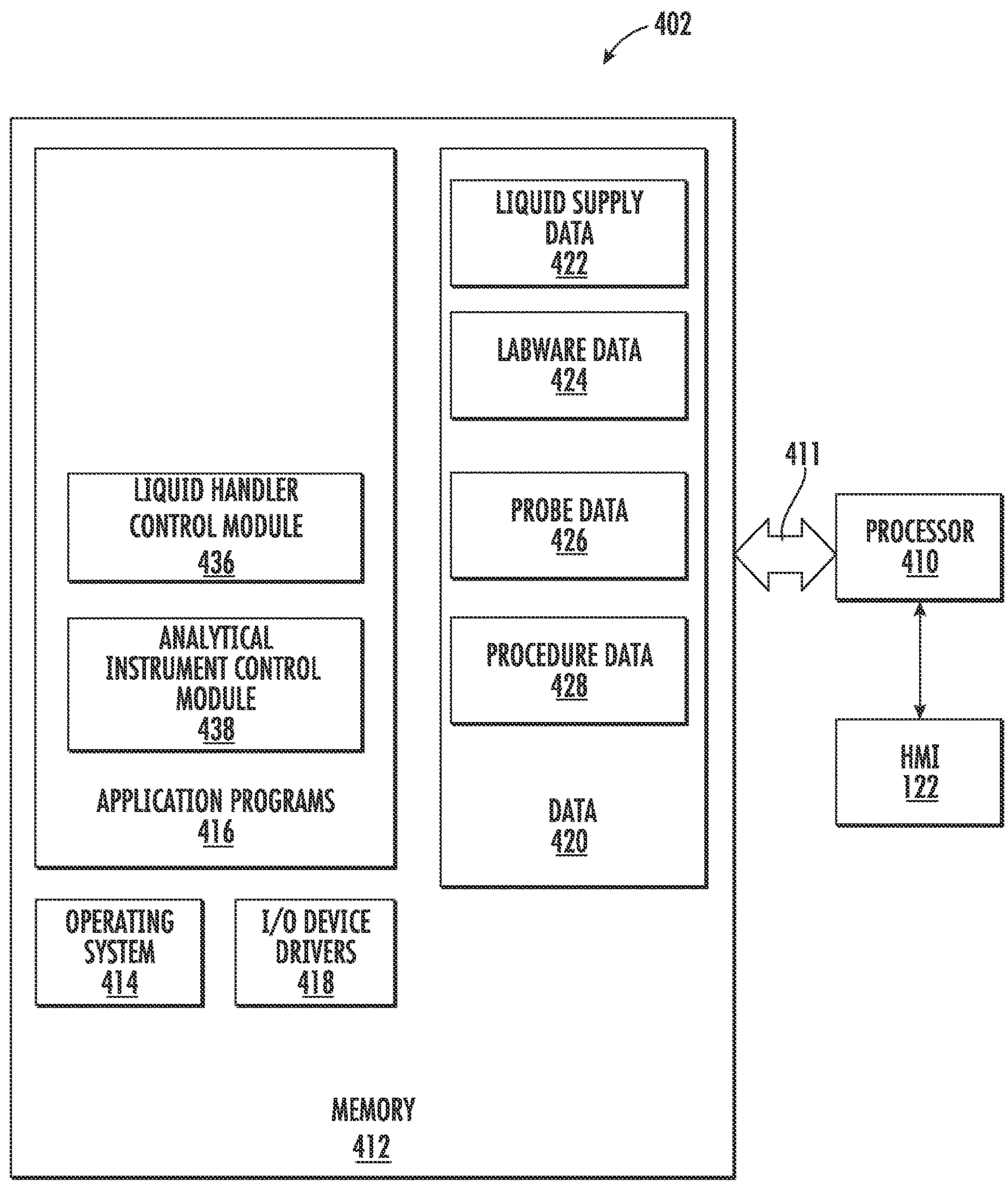
FIG. 20 is a schematic diagram representing a controller forming a part of the automated liquid handling system of FIG. 3.

FIG. 20 is a schematic illustration of a circuit or data processing system 402 that can be used in the controller 120. The circuits and/or data processing systems may be incorporated in a digital signal processor 410 in any suitable device or devices. The processor 410 communicates with the HMI 122 and memory 412 via an address/data bus 411. The processor 410 can be any commercially available or custom microprocessor. The memory 412 is representative of the overall hierarchy of memory devices containing the software and data used to implement the functionality of the data processing system. The memory 412 can include, but is not limited to, the following types of devices: cache, ROM, PROM, EPROM, EEPROM, flash memory, SRAM, and DRAM.

FIG. 20 illustrates that the memory 412 may include several categories of software and data used in the data processing system: the operating system 414; the application programs 416; the input/output (I/O) device drivers 418; and data 420.

The data 420 can include equipment-specific data. FIG. 20 also illustrates that the data 420 can include liquid supply data 422, labware data 424, probe data 426, and procedure data 428.

The liquid supply data 422 can include data relating to or representing characteristics of the liquid supplies S1, S2.

The liquid supply data 422 may include, for example, a unique identifier (e.g., serial number) and/or name for each container 170, 172, 174, 176, 178, 370, 372, a unique identifier and/or name for each reservoir 171, 173, 175, 371, 373, and/or description of the liquids C1, C2 contained in the reservoirs. The liquid supply data 422 can include dimensions of the containers and/or the reservoirs. The liquid supply data 422 can include location data representing spatial or geometric layout or positions of the reservoirs.

The labware data 424 can include data relating to or representing characteristics of the containers that are intended to receive the mixture liquid M or remixed liquid RM.

The probe data 426 can include probe location data representing spatial or geometric layout or positions of the probes 150 relative to the liquid supplies S1, S2, the deck 112 and/or other parts of the system 110.

The probe data 426 may include, for example, a unique identifier (e.g., serial number) and/or name for each probes 150. The probe data 426 can include dimensions of the probes 150, and/or the probe modules 140, 340. The probe data 426 can include location data representing spatial or geometric layout or positions of the probes 150 and the probe modules 140, 440.

The procedure data 428 can include data representing a protocol or sequence of steps to execute the procedures described herein. The sequence of steps may include all or some of the steps described above as executed by the controller 120. The sequence of steps may include an analytical sequence, for example.

FIG. 20 also illustrates that application programs 416 can include a liquid handler control module 436 to control the liquid handler 130, and an analytical instrument control module 438. The liquid handler control module 436 may include modules to control the probe positioning system 144 (e.g., including the actuators 146, 148) and to control the pressure control mechanism (e.g., including the pump actuator 134). The analytical instrument control module 438 may be configured to control operation of the analytical instrument 116.

As will be appreciated by those of skill in the art, the operating system 414 may be any operating system suitable for use with a data processing system. The I/O device drivers 418 typically include software routines accessed through the operating system 414 by the application programs 416 to communicate with devices such as I/O data port(s), data storage and certain memory components. The application programs 416 are illustrative of the programs that implement the various features of the data processing system and can include at least one application, which supports operations according to embodiments of the present technology. Finally, the data 420 represents the static and dynamic data used by the application programs 416, the operating system 414, the I/O device drivers 418, and other software programs that may reside in the memory 412.

As will be appreciated by those of skill in the art, other configurations may also be utilized while still benefiting from the teachings of the present technology. For example, one or more of the modules may be incorporated into the operating system, the I/O device drivers or other such logical division of the data processing system. Thus, the present technology should not be construed as limited to the configuration of FIG. 20, which is intended to encompass any configuration capable of carrying out the operations described herein. Further, one or more of the modules can communicate with or be incorporated totally or partially in other components, such as the controller 120.

The present technology has been described herein with reference to the accompanying drawings, in which illustrative embodiments of the technology are shown. In the drawings, the relative sizes of regions or features may be exaggerated for clarity. This technology may, however, be embodied in many different forms and should not be construed as limited to the embodiments set forth herein; rather, these embodiments are provided so that this disclosure will be thorough and complete, and will fully convey the scope of the technology to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer, or section. Thus, a first element, component, region, layer, or section discussed below could be termed a second element, component, region, layer, or section without departing from the teachings of the present technology.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

The term "automatically" means that the operation is substantially, and may be entirely, carried out without human or manual input, and can be programmatically directed or carried out.

The term "programmatically" refers to operations directed and/or primarily carried out electronically by computer program modules, code and/or instructions.

The term "electronically" includes both wireless and wired connections between components.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed is:

1. A method for mixing liquids using an automated liquid handling system, wherein the automated liquid handling system comprises a probe module including a plurality of tubular probes mounted on a module base for movement therewith via a probe module positioning system and a pressure control mechanism including a plurality of pumps and a pump actuator, each tubular probe having a probe inlet and is fluidly coupled to a respective pump by respective tubing, the method comprising:

positioning and inserting the plurality of tubular probes into a first liquid supply using the probe module positioning system;

aspirating liquid volumes of a first liquid from the first liquid supply into the plurality of tubular probes through the respective probe inlets through generation of a negative pressure in each tubular probe by the respective pump;

positioning and inserting the plurality of tubular probes into a second liquid supply using the probe module positioning system;

aspirating liquid volumes of a second liquid from the second liquid supply into the plurality of tubular probes through the respective probe inlets through generation of a negative pressure in each tubular probe by the respective pump;

alternating aspirating liquid volumes from the first and second liquids into a mixing volume in each tubular probe through the respective probe inlets via the respective pumps such that the aspirated liquid volumes form a liquid stack in each tubular probe including a series of alternating, interfacing layers of the first and second liquids in the respective mixing volumes in each tubular probe;

permitting the interfacing layers of the first and second liquids to substantially mix with one another by diffusion in the respective mixing volumes to form a mixture liquid in each tubular probe;

dispensing a first volume of the mixture liquid from each tubular probe through the respective probe inlets through generation of a positive pressure in each tubular probe by the respective pump into a first reservoir;

dispensing a second volume of the mixture liquid from each probe through the respective probe inlets through generation of a positive pressure in each tubular probe by the respective pump into a second reservoir;

positioning and inserting the plurality of tubular probes into the first reservoir using the probe module positioning system;

aspirating liquid volumes of the mixture liquid from the first reservoir into the plurality of tubular probes through the respective probe inlets through generation of a negative pressure in each tubular probe by the respective pump;

positioning and inserting the plurality of tubular probes into the second reservoir using the probe module positioning system;

aspirating liquid volumes of the mixture liquid from the second reservoir into the plurality of tubular probes through the respective probe inlets through generation of a negative pressure in each tubular probe by the respective pump to form interfacing layers of the mixture liquid from the first and second reservoirs; and permitting the interfacing layers of the mixture liquid from the first and second reservoirs to substantially mix with one another by diffusion to achieve a more complete and uniform physical mixing of the first and second liquids.

2. The method of claim 1, wherein the second liquid is different from the first liquid.

3. The method of claim 1, wherein the liquid stack includes at least three layers of the first liquid disposed in alternating series with at least two layers of the second liquid.

4. The method of claim 1, wherein each of the layers of the first and second liquids has a volume in the range of from about 3 microliters to 25 microliters.

5. The method of claim 1, wherein permitting the interfacing layers of the first and second liquids to mix with one another by diffusion in the mixing volume to form the mixture liquid includes permitting the interfacing layers of the first and second liquids to mix with one another by diffusion in the mixing volume for at least 4 seconds.

6. The method of claim 1, wherein the first liquid has a different viscosity than the second liquid.

7. The method of claim 1, wherein:

the mixing volume is elongate and has a lengthwise axis; and the layers of the first and second liquids in the liquid stack are stacked along the lengthwise axis.

8. The method of claim 1, wherein each of the layers of the first and second liquids has a layer diameter to layer height ratio of at least 0.016.

9. The method of claim 1, wherein:

each of the layers of the first and second liquids has a layer liquid volume and an interface surface area with an adjacent one of the layers of the first and second liquids; and a ratio of the interface surface area to the layer liquid volume is at least 0.02 l/mm.

10. The method of claim 1, wherein:

each tubular probe includes a probe passage; and at least a portion of the liquid stack is disposed in the probe passage during permitting the interfacing layers of the first and second liquids to mix with one another by diffusion in the mixing volume to form the mixture liquid.

11. The method of claim 1, wherein:

the respective tubing which couples each probe inlet to the respective pump further comprises a flexible conduit; and at least a portion of the liquid stack is disposed in the flexible conduit during permitting the interfacing layers of the first and second liquids to mix with one another by diffusion in the mixing volume to form the mixture liquid.

12. The method of claim 1, wherein:

aspirating liquid volumes of the first and second liquids from alternating ones of the first and second liquid supplies into the mixing volume of each tubular probe includes:

automatically and programmatically positioning the probe inlets in a first container; thereafter automatically and programmatically aspirating a first liquid volume of the first liquid into the plurality of tubular probes through the respective probe inlets; thereafter automatically and programmatically positioning the probe inlets in a second container; thereafter automatically and programmatically aspirating a second liquid volume of the second liquid into the plurality of tubular probes through the respective probe inlets; thereafter automatically and programmatically positioning the probe inlets in the first container; thereafter automatically and programmatically aspirating a third liquid volume of the first liquid into the plurality of tubular probes through the respective probe inlets; thereafter automatically and programmatically positioning the probe inlets in the second container; and thereafter automatically and programmatically aspirating a fourth liquid volume of the second liquid into the plurality of tubular probes through the respective probe inlets.

13. The method of claim 1, wherein the liquid stack is retained in the mixing volume of each tubular probe for a predetermined amount of time between the formation of the liquid stack and the dispensing of the mixture liquid, thereby allowing the liquid volumes of the first and second liquids to completely mix with one another within the tubular probes.

14. The method of claim 1, wherein aspirating liquid volumes of the first and second liquids from alternating ones of the first and second liquid supplies includes automatically and programmatically operating the pump actuator to aspirate the liquid volumes of the first and second liquids through each of the probe inlets.

15. The method of claim 1, wherein the mixing volume in each tubular probe is in a range of from about 10 microliters to about 100 microliters.

16. The method of claim 1, further comprising:

alternating aspirating liquid volumes from the first and second reservoirs into each tubular probe through the respective probe inlets via the respective pumps such that the aspirated liquid volumes form a mixture stack in each tubular probe including a series of alternating, interfacing layers of the mixture liquid from the first and second reservoirs in each tubular probe.

17. The method of claim 1, wherein the first liquid has a different composition than the second liquid.

18. The method of claim 17, wherein the first liquid is a reaction mixture including DNA fragments and the second liquid includes a ligase enzyme.

19. The method of claim 1, wherein the liquid stack includes at least two layers of the first liquid disposed in alternating series with at least two layers of the second liquid.

20. The method of Claim 19, wherein a total volume of the layers of the first liquid in the liquid stack is greater than a total volume of the layers of the second liquid in the liquid stack.

21. The method of Claim 19, wherein a total volume of the layers of the first liquid in the liquid stack is substantially equal to a total volume of the layers of the second liquid in the liquid stack.

22. The method of claim 1, wherein aspirating liquid volumes of the first and second liquids from alternating ones of the first and second liquid supplies into the mixing volume includes automatically and programmatically operating the plurality of pumps coupled to the plurality of tubular probes to aspirate the first and second liquids from the first and second liquid supplies.

23. The method of claim 22, wherein dispensing the mixture liquid from each tubular probe includes automatically and programmatically operating the plurality of pumps to dispense the mixture liquid out the probe inlets of the plurality of tubular probes.

24. The method of claim 22, wherein each pump of the plurality of pumps is a syringe pump, bellows, peristaltic pump, or screw-type pump.

25. A method for mixing liquids using an automated liquid handling system, wherein the automated liquid handling system comprises a probe module including a first tubular probe and a second tubular probe, the method comprising:

inserting the first tubular probe into a first liquid supply;

aspirating a liquid volume of a first liquid from the first liquid supply into the first tubular probe;

inserting the first tubular probe into a second liquid supply;

aspirating a liquid volume of a second different liquid from the second liquid supply into the first tubular probe;

alternating aspirating the first liquid supply and the second different liquid supply into a mixing volume in the first tubular probe such that the aspirated liquid volumes form a liquid stack in the first tubular probe including a series of alternating, interfacing layers of the first and second liquids in the mixing volume;

permitting the interfacing layers of the first and second liquids to substantially mix with one another by diffusion in the mixing volume to form a mixture liquid in the first tubular probe;

dispensing a first volume of the mixture liquid from the first tubular probe into a first reservoir;

dispensing a second volume of the mixture liquid from the first tubular probe into a second reservoir;

inserting the second tubular probe into the first reservoir;

aspirating a liquid volume of the mixture liquid from the first reservoir;

inserting the second tubular probe into the second reservoir;

aspirating a liquid volume of the mixture liquid from the second reservoir;

alternating aspirating liquid volumes of the mixture liquid from the first and second reservoirs into a mixing volume in the second tubular probe such that the aspirated liquid volumes of the mixture liquid form a second liquid stack in the second tubular probe including a series of alternating, interfacing layers of the mixture liquid in the mixing volume in the second tubular probe;

permitting the interfacing layers of the mixture liquid to substantially mix with one another by diffusion in the mixing volume in the second tubular probe to form a second mixture liquid; and dispensing the second mixture liquid from the mixing volume in the second tubular probe.

* * * * *